(12) United States Patent
Kondo

(10) Patent No.: US 8,355,603 B2
(45) Date of Patent: Jan. 15, 2013

(54) DATA CONVERTING APPARATUS AND DATA CONVERTING METHOD, LEARNING DEVICE AND LEARNING METHOD, AND RECORDING MEDIUM

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1899 days.

(21) Appl. No.: 10/481,722

(22) PCT Filed: Apr. 22, 2003

(86) PCT No.: PCT/JP03/05079
§ 371 (c)(1),
(2), (4) Date: Dec. 23, 2003

(87) PCT Pub. No.: WO03/092283
PCT Pub. Date: Nov. 6, 2003

(65) Prior Publication Data
US 2004/0234160 A1 Nov. 25, 2004

(30) Foreign Application Priority Data
Apr. 26, 2002 (JP) .............................. P2002-125627

(51) Int. Cl.
*G06K 9/32* (2006.01)
*G06K 9/40* (2006.01)
*G06K 9/62* (2006.01)
*H04N 7/01* (2006.01)
*H04N 11/20* (2006.01)
*H04N 5/44* (2011.01)
*G09G 5/02* (2006.01)

(52) U.S. Cl. ........ 382/300; 382/155; 382/254; 382/260; 382/261; 382/298; 382/299; 348/441; 348/561; 345/698; 345/699

(58) Field of Classification Search .................. 382/155, 382/254, 260, 261, 298–300; 348/441, 561, 348/698, 699; 345/698, 699
See application file for complete search history.

(56) References Cited

U.S. PATENT DOCUMENTS
4,587,556 A * 5/1986 Collins ........................ 348/443
(Continued)

FOREIGN PATENT DOCUMENTS
EP 0 892 558 1/1999
(Continued)

OTHER PUBLICATIONS

Ghosal S. et al.: "Learning partitioned least squares filters for fingerprint enhancement" Proceedings of the IEEE Workshop on Applications of Computer Vision, XX, XX, vol. $5^{th}$, Dec. 4, 2000, pp. 2-7, XP007905025.

*Primary Examiner* — Matthew Bella
*Assistant Examiner* — Jose M Torres
(74) *Attorney, Agent, or Firm* — Frommer Lawrence & Haug LLP; William S. Frommer; Thomas F. Presson

(57) ABSTRACT

The present invention relates to a data conversion apparatus and a learning device in which an image can be converted into a higher-quality image. A class-tap generating circuit (2) and a predictive-tap generating circuit (3) respectively generate from an SD image a class tap for classifying a specified pixel of an HD image and a predictive tap for determining the specified pixel. A classification circuit (4) classifies the specified pixel based on the class tap. A coefficient RAM (5) obtains a tap coefficient for the class of the specified pixel from tap coefficients obtained by using supervisor pixels and learner pixels and by learning the relationship between the supervisor pixels and the learner pixels for each of at least one class while applying weighting to the supervisor pixels and the learner pixels based on the activity of the predictive tap generated from the learner pixels. A predictive-computation circuit (6) determines the specified pixel by using the tap coefficient and the predictive tap.

33 Claims, 16 Drawing Sheets

U.S. PATENT DOCUMENTS

| | | | | |
|---|---|---|---|---|
| 5,517,588 | A * | 5/1996 | Kondo | 382/300 |
| 5,790,692 | A | 8/1998 | Price et al. | |
| 5,912,708 | A | 6/1999 | Kondo et al. | 348/415 |
| 5,940,132 | A * | 8/1999 | Kondo et al. | 348/441 |
| 6,233,019 | B1 | 5/2001 | Kondo et al. | 348/458 |
| 6,323,905 | B1 | 11/2001 | Kondo et al. | |
| 6,571,142 | B1 | 5/2003 | Kondo et al. | 700/90 |
| 6,657,677 | B1 * | 12/2003 | He et al. | 348/625 |
| 6,678,405 | B1 | 1/2004 | Kondo et al. | 382/159 |
| 6,714,252 | B2 * | 3/2004 | Kondo et al. | 348/458 |
| 6,859,495 | B1 * | 2/2005 | Poon et al. | 375/240.21 |
| 7,031,513 | B1 * | 4/2006 | Kondo | 382/155 |
| 7,477,801 | B2 * | 1/2009 | Kondo et al. | 382/299 |
| 7,630,576 | B2 * | 12/2009 | Kondo | 382/276 |
| 7,679,675 | B2 * | 3/2010 | Kondo | 348/448 |
| 2002/0019892 | A1 * | 2/2002 | Kondo et al. | 710/62 |

FOREIGN PATENT DOCUMENTS

| | | |
|---|---|---|
| EP | 1 001 371 | 5/2000 |
| JP | 8 79712 | 3/1996 |
| JP | 10-136317 | 5/1998 |
| JP | 10-243405 | 9/1998 |
| JP | 11 27564 | 1/1999 |
| JP | 2000 115721 | 4/2000 |
| JP | 2000-148724 | 5/2000 |
| JP | 2000 241803 | 9/2000 |
| JP | 2000 299862 | 10/2000 |
| JP | 2000 348019 | 12/2000 |
| JP | 2001-8056 | 1/2001 |
| JP | 2001-195586 | 7/2001 |
| JP | 2001-236339 | 8/2001 |
| WO | WO 98/30027 | 7/1998 |

* cited by examiner

DATA CONVERTING APPARATUS AND DATA CONVERTING METHOD, LEARNING DEVICE AND LEARNING METHOD, AND RECORDING MEDIUM

TECHNICAL FIELD

The present invention relates to data conversion apparatuses and methods, learning devices and methods, programs, and recording media. More particularly, the invention relates to a data conversion apparatus and method, a learning device and method, a program, and a recording medium in which image data, for example, can be converted into higher-quality image data.

BACKGROUND ART

The applicant of this application previously proposed classification adaptive processing as data conversion processing for improving the quality of images or performing other types of image conversion.

The classification adaptive processing includes classification processing and adaptive processing: data is classified by classification processing according to the property of the data, and each class of the data is subjected to adaptive processing. The adaptive processing is, for example, as follows.

In the adaptive processing, for example, low-quality or standard-quality image (hereinafter sometimes referred to as an "SD (Standard Definition) image") data is mapped by using predetermined tap coefficients so as to be converted into high-quality image (hereinafter sometimes referred to as an "HD (High Definition) image") data.

It is now assumed that, for example, a linear coupling model is employed as the mapping method using tap coefficients. In this case, the pixel values of pixels y forming HD image data (hereinafter sometimes referred to as "HD pixels") are determined by using tap coefficients and a plurality of pixels forming SD image data (hereinafter sometimes referred to as "SD pixels") extracted as predictive taps for predicting the HD pixels according to the following linear equation (linear coupling).

$$y = \sum_{n=1}^{N} w_n x_n \quad (1)$$

In equation (1), $x_n$ indicates the pixel value of the n-th pixel of the SD image data (hereinafter sometimes referred to as the "SD pixel") forming the predictive taps for the HD pixel y, and $w_n$ indicates the n-th tap coefficient to be multiplied with the pixel value of the n-th SD pixel. In equation (1), it is assumed that the predictive taps consist of N SD pixels $x_1, x_2, \ldots, x_N$.

The pixel value y of the HD pixel may be determined by equations of higher degrees, such as a quadratic equation, rather than by the linear equation expressed in (1).

When the true value of the pixel value of the k-th sample HD pixel is indicated by $y_k$, and when the predictive value of the true value $y_k$ determined by equation (1) is indicated by $y_k'$, the predictive error $e_k$ is expressed by the following equation.

$$e_k = y_k - y_k' \quad (2)$$

Since the predictive value $y_k'$ in equation (2) is determined by equation (1), equation (1) is substituted into $y_k'$ in equation (2), thereby obtaining the following equation.

$$e_k = y_k - \left( \sum_{n=1}^{N} w_n x_{n,k} \right) \quad (3)$$

In equation (3), $x_{n,k}$ designates the n-th SD pixel forming the predictive taps for the k-th sample HD pixel.

The tap coefficient $w_n$ that sets the predictive error $e_k$ to be 0 in equation (3) is the optimal value for predicting the HD pixel. Generally, however, it is difficult to determine such tap coefficients $w_n$ for all the HD pixels.

Accordingly, as the standard for the optimal tap coefficient $w_n$, the method of least squares, for example, is used. Then, the optimal tap coefficient $w_n$ can be determined by minimizing the sum E of the square errors as the statistical error expressed by the following equation.

$$E = \sum_{k=1}^{K} e_k^2 \quad (4)$$

In equation (4), K indicates the number of set samples of the HD pixel $y_k$ and the SD pixels $x_{1,k}, x_{2,k}, \ldots, x_{N,k}$ forming the predictive taps for the HD pixel $y_k$.

The tap coefficient $w_n$ that minimizes the sum E of the square errors in equation (4) must satisfy the condition that the value determined by partial-differentiating the sum E with the tap coefficient $w_n$ becomes 0, and thus, the following equation must be established.

$$\frac{\partial E}{\partial w_n} = e_1 \frac{\partial e_1}{\partial w_n} + e_2 \frac{\partial e_2}{\partial w_n} + \ldots + e_k \frac{\partial e_n}{\partial w_n} = 0 \quad (n = 1, 2, \ldots, N) \quad (5)$$

Accordingly, by partial-differentiating equation (3) with the tap coefficient $w_n$, the following equation can be found.

$$\frac{\partial e_k}{\partial w_1} = -x_{1,k}, \frac{\partial e_k}{\partial w_2} = -x_{2,k}, \ldots, \quad (6)$$

$$\frac{\partial e_k}{\partial w_N} = -x_{N,k}, (k = 1, 2, \ldots, K)$$

The following equation can be found from equations (5) and (6).

$$\sum_{k=1}^{K} e_k x_{1,k} = 0, \sum_{k=1}^{K} e_k x_{2,k} = 0, \ldots \sum_{k=1}^{K} e_k x_{N,k} = 0 \quad (7)$$

By substituting equation (3) into $e_k$ in equation (7), equation (7) can be expressed by the normal equations expressed by equations (8).

$$\begin{bmatrix} \left(\sum_{k=1}^{K} x_{1,k}x_{1,k}\right) & \left(\sum_{k=1}^{K} x_{1,k}x_{2,k}\right) & \cdots & \left(\sum_{k=1}^{K} x_{1,k}x_{N,k}\right) \\ \left(\sum_{k=1}^{K} x_{2,k}x_{1,k}\right) & \left(\sum_{k=1}^{K} x_{2,k}x_{2,k}\right) & \cdots & \left(\sum_{k=1}^{K} x_{2,k}x_{N,k}\right) \\ \vdots & \vdots & \ddots & \vdots \\ \left(\sum_{k=1}^{K} x_{N,k}x_{1,k}\right) & \left(\sum_{k=1}^{K} x_{N,k}x_{2,k}\right) & \cdots & \left(\sum_{k=1}^{K} x_{N,k}x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k}y_k\right) \\ \left(\sum_{k=1}^{K} x_{2,k}y_k\right) \\ \vdots \\ \left(\sum_{k=1}^{K} x_{N,k}y_k\right) \end{bmatrix} \tag{8}$$

By preparing a certain number of sets of the HD pixels $y_k$ and the SD pixels $x_{n,k}$, the same number of normal equations (8) as the number of tap coefficients $w_n$ to be determined can be found, and by solving equations (8) (the matrix at the left side next to the tap coefficients $w_n$ in equations (8) must be regular to solve equations (8)), the optimal tap coefficients $w_n$ can be determined. In solving equations (8), the sweep-out method (Gauss-Jordan elimination), for example, may be employed.

As described above, by solving equations (8) by setting many HD pixels $y_1, y_2, \ldots, y_k$ to be supervisor data as supervisors for learning tap coefficients and by setting SD pixels $x_{1,k}, x_{2,k}, \ldots, x_{N,k}$ forming the predictive taps for each HD pixel $y_k$ to be learner data as learners for learning the tap coefficients, learning is conducted for determining the optimal tap coefficients $w_n$. By using the optimal tap coefficients $w_n$, SD image data is mapped (converted) onto (into) HD image data by using equation (1). The above-described processing is adaptive processing.

The adaptive processing is different from mere interpolation processing in that components contained not in SD images but in HD images are reproduced. More specifically, only from equation (1), the adaptive processing is similar to the so-called "interpolation processing" using interpolation filters. However, the tap coefficients $w_n$, which correspond to tap coefficients used in the interpolation filters, are determined by learning by using HD image data as supervisor data and SD image data as learner data. Thus, components contained in HD images can be reproduced. Accordingly, it is possible that the adaptive processing serves the function of creating images (creating the resolution).

In learning tap coefficients $w_n$, the combinations of supervisor data y and learner data x can be changed so as to obtain tap coefficients $w_n$ performing various conversions.

If HD image data is used as the supervisor data y, and if SD image data determined by adding noise or blurring to the HD image data is used as the learner data x, tap coefficients $w_n$ for converting an image into an image without noise or blurring can be obtained. If HD image data is used as the supervisor data y, and if SD image data determined by decreasing the resolution of the HD image data is used as the learner data x, tap coefficients $w_n$ for converting an image into an image having improved resolution can be obtained. If image data is used as the supervisor data y, and if DCT (discrete cosine transform) coefficients determined by performing DCT on the image data is used as the learner data x, tap coefficients $w_n$ for converting the DCT coefficients into image data can be obtained.

As described above, in classification adaptive processing, the tap coefficient $w_n$ that minimizes the sum of the square errors in equation (4) is determined for each class, and equation (1) is calculated by using the tap coefficient $w_n$, thereby converting an SD image into a high-quality HD image. That is, by using the tap coefficients $w_n$ and the predictive taps $x_n$ generated by the SD image, equation (1) is calculated so as to determine HD pixels forming the HD image.

Accordingly, when the dynamic range of the predictive taps is small, the HD pixels are more vulnerable to variations in the values of the predictive taps $x_n$ (pixel values of the SD pixels $x_n$ forming the predictive taps) compared to when the dynamic range is large.

For the sake of simplicity, it is now assumed, as shown in FIG. 1A, that a predictive tap consists of two SD pixels $x_1$ and $x_2$, and the pixel value y of the HD pixel is determined by the following equation corresponding to equation (1).

$$y = w_1 x_1 + w_2 x_2 \tag{9}$$

Since the dynamic range of a predictive tap is determined by subtracting the minimum value from the maximum value forming the predictive tap, the dynamic range D of the predictive tap shown in FIG. 1A is expressed by the following equation.

$$D = x_2 - x_1 \tag{10}$$

In this case, the HD pixel y in equation (9) can be expressed by the following equation from equation (10).

$$y = (w_1 + w_2) x_1 + w_2 D \tag{11}$$

It is now assumed, as shown in FIG. 1B, that, between the SD pixels $x_1$ and $x_2$ forming the predictive tap shown in FIG. 1A, the SD pixel $x_2$ is displaced by $\Delta x_2$ and is represented by $x_2'$. Then, the HD pixel y' can be determined from the predictive tap consisting of the SD pixels $x_1$ and $x_2'$ according to the following equation.

$$y' = w_1 x_1 + w_2 x_2' \tag{12}$$

The dynamic range D' of the predictive tap shown in FIG. 1B is expressed by the following equation.

$$D' = x_2' - x_1 \tag{13}$$

In this case, the HD pixel y' in equation (12) can be expressed by the following equation from equation (13).

$$y' = (w_1 + w_2) x_1 + w_2 D' \tag{14}$$

Since the SD pixel $x_2'$ is displaced from the SD pixel $x_2$ by $\Delta x_2$, it can be expressed by the following equation.

$$x_2' = x_2 + \Delta x_2 \tag{15}$$

The dynamic range D' in equation (13) can be expressed by the following equation from equation (15).

$$\begin{aligned} D' &= x_2 + \Delta x_2 - x_1 \\ &= D + \Delta x_2 \end{aligned} \tag{16}$$

By substituting equation (16) into equation (14), the HD pixel y' can be determined by the following equation.

$$y' = (w_1 + w_2)x_1 + w_2(D + \Delta x_2) \quad (17)$$

Accordingly, when the SD pixel $x_2$ forming the predictive tap shown in FIG. 1A is displaced from $\Delta x_2$, the resulting HD pixel is changed from y expressed by equation (11) to y' expressed by equation (17).

The value equal to the amount by which the HD pixel determined by a predictive tap before being displaced is changed to the HD pixel determined by a predictive tap after being displaced is referred to as the "displacement rate R", which can be expressed by, for example, the following equation.

$$R = \frac{|y' - y|}{y} \quad (18)$$

By substituting equations (11) and (17) into equation (18), the displacement rate R can be determined by the following equation.

$$R = \frac{w_2 \Delta x_2}{(w_1 + w_2)x_1 + w_2 D} \quad (19)$$

According to equation (19), the displacement rate R becomes smaller as the dynamic range D of the predictive tap is larger, and conversely, the displacement rate R becomes larger as the dynamic range D of the predictive tap is smaller.

This means that a displacement of the predictive tap hardly influences the resulting HD pixel when the dynamic range D of the predictive tap is large, and conversely, a displacement of the predictive tap considerably influences the resulting HD pixel when the dynamic range D of the predictive tap is small.

Accordingly, when the dynamic range of the predictive tap is large, the influence of a displacement of the predictive tap on the resulting HD pixel can be suppressed by the so-called "masking effect" due to the large dynamic range (hereinafter sometimes referred to as the "DR masking effect" of masking the influence of a displacement of a predictive tap on the resulting HD pixel by a large dynamic range). However, when the dynamic range of the predictive tap is small, the above-described DR masking effect does not function, and thus, a displacement of the predictive tap considerably influences the resulting HD pixel.

Thus, the quality of a resulting HD image becomes different between when a predictive tap has a large dynamic range and when a predictive tap has a small dynamic range, thereby making the user feel unnatural.

The level of the DR masking effect also changes the quality of an HD image obtained as a result of performing classification adaptive processing. Accordingly, if the level of the DR masking effect is adjustable by the user, the user is able to obtain an image having a desired quality.

DISCLOSURE OF INVENTION

Accordingly, in view of this background, it is an object of the present invention to convert, for example, image data, into higher-quality image data, and also to enable a user to adjust the image quality of the image data.

A data conversion apparatus of the present invention includes: class-tap generating means for generating, from first data, a class tap used for classifying a specified item of second data into a class of at least one class; classification means for classifying the specified item of the second data based on the class tap; predictive-tap generating means for generating a predictive tap for determining the specified item of the second data from the first data; tap-coefficient obtaining means for obtaining a tap coefficient for the class of the specified item of the second data from tap coefficients obtained by using second learning data corresponding to the second data and first learning data corresponding to the first data and by learning a relationship between the second learning data and the first learning data for each of at least one class while applying weighting to the second learning data and the first learning data based on an activity of the predictive tap generated from the first learning data; and computation means for determining the specified item of the second data by using the predictive tap and the tap coefficient for the class of the specified item of the second data.

A data conversion method of the present invention includes: a class-tap generating step of generating, from first data, a class tap used for classifying a specified item of second data into a class of at least one class; a classification step of classifying the specified item of the second data based on the class tap; a predictive-tap generating step of generating a predictive tap for determining the specified item of the second data from the first data; a tap-coefficient obtaining step of obtaining a tap coefficient for the class of the specified item of the second data from tap coefficients obtained by using second learning data corresponding to the second data and first learning data corresponding to the first data and by learning a relationship between the second learning data and the first learning data for each of at least one class while applying weighting to the second learning data and the first learning data based on an activity of the predictive tap generated from the first learning data; and a computation step of determining the specified item of the second data by using the predictive tap and the tap coefficient for the class of the specified item of the second data.

A first program of the present invention includes: a class-tap generating step of generating, from first data, a class tap used for classifying a specified item of second data into a class of at least one class; a classification step of classifying the specified item of the second data based on the class tap; a predictive-tap generating step of generating a predictive tap for determining the specified item of the second data from the first data; a tap-coefficient obtaining step of obtaining a tap coefficient for the class of the specified item of the second data from tap coefficients obtained by using second learning data corresponding to the second data and first learning data corresponding to the first data and by learning a relationship between the second learning data and the first learning data for each of at least one class while applying weighting to the second learning data and the first learning data based on an activity of the predictive tap generated from the first learning data; and a computation step of determining the specified item of the second data by using the predictive tap and the tap coefficient for the class of the specified item of the second data.

A first recording medium of the present invention records a program therein, the program including: a class-tap generating step of generating, from first data, a class tap used for classifying a specified item of second data into a class of at least one class; a classification step of classifying the specified item of the second data based on the class tap; a predictive-tap generating step of generating a predictive tap for determining the specified item of the second data from the first data; a tap-coefficient obtaining step of obtaining a tap coefficient for the class of the specified item of the second data from tap coefficients obtained by using second learning data corresponding to the second data and first learning data corresponding to the first data and by learning a relationship between the second learning data and the first learning data for each of at least one class while applying weighting to the second learning data and the first learning data based on an activity of the predictive tap generated from the first learning data; and a computation step of determining the specified item of the second data by using the predictive tap and the tap coefficient for the class of the specified item of the second data.

A first learning device of the present invention includes: class-tap generating means for generating a class tap from first learning data corresponding to first data, the class tap being used for classifying a specified item of second learning data corresponding to second data used for learning the tap coefficient into a class of at least one class; classification means for classifying the specified item of the second data based on the class tap; predictive-tap generating means for generating a predictive tap used for determining the specified item of the second data from the first learning data; learning means for determining the tap coefficient for each of at least one class by learning a relationship between the second learning data and the first learning data for each of at least one class while applying predetermined weighting to the predictive tap and the specified item of the second data; activity detection means for determining an activity of the predictive tap obtained for the specified item of the second data; and weighting control means for controlling weighting applied to the predictive tap and the specified item of the second data in the learning means based on the activity of the predictive tap obtained for the specified item of the second data.

A first learning method of the present invention includes: a class-tap generating step of generating a class tap from first learning data corresponding to first data, the class tap being used for classifying a specified item of second learning data corresponding to second data used for learning the tap coefficient into a class of at least one class; a classification step of classifying the specified item of the second data based on the class tap; a predictive-tap generating step of generating a predictive tap used for determining the specified item of the second data from the first learning data; a learning step of determining the tap coefficient for each of at least one class by learning a relationship between the second learning data and the first learning data for each of at least one class while applying predetermined weighting to the predictive tap and the specified item of the second data; an activity detection step of determining an activity of the predictive tap obtained for the specified item of the second data; and a weighting control step of controlling weighting applied to the predictive tap and the specified item of the second data in the learning step based on the activity of the predictive tap obtained for the specified item of the second data.

A second program of the present invention includes: a class-tap generating step of generating a class tap from first learning data corresponding to first data, the class tap being used for classifying a specified item of second learning data corresponding to second data used for learning the tap coefficient into a class of at least one class; a classification step of classifying the specified item of the second data based on the class tap; a predictive-tap generating step of generating a predictive tap used for determining the specified item of the second data from the first learning data; a learning step of determining the tap coefficient for each of at least one class by learning a relationship between the second learning data and the first learning data for each of at least one class while applying predetermined weighting to the predictive tap and the specified item of the second data; an activity detection step of determining an activity of the predictive tap obtained for the specified item of the second data; and a weighting control step of controlling weighting applied to the predictive tap and the specified item of the second data in the learning step based on the activity of the predictive tap obtained for the specified item of the second data.

A second recording medium of the present invention records a program therein, the program including: a class-tap generating step of generating a class tap from first learning data corresponding to the first data, the class tap being used for classifying a specified item of second learning data corresponding to the second data used for learning the tap coefficient into a class of at least one class; a classification step of classifying the specified item of the second data based on the class tap; a predictive-tap generating step of generating a predictive tap used for determining the specified item of the second data from the first learning data; a learning step of determining the tap coefficient for each of at least one class by learning a relationship between the second learning data and the first learning data for each of at least one class while applying predetermined weighting to the predictive tap and the specified item of the second data; an activity detection step of determining an activity of the predictive tap obtained for the specified item of the second data; and a weighting control step of controlling weighting applied to the predictive tap and the specified item of the second data in the learning step based on the activity of the predictive tap obtained for the specified item of the second data.

A second learning device of the present invention includes: class-tap generating means for generating a class tap from first learning data corresponding to first data, the class tap being used for classifying a specified item of second learning data corresponding to second data used for learning coefficient source data into a class of at least one class; classification means for classifying the specified item of the second data based on the class tap; predictive-tap generating means for generating a predictive tap used for determining the specified item of the second data from the first learning data; learning means for determining the coefficient source data for each of at least one class by learning a relationship between the second learning data and the first learning data for each of at least one class while applying predetermined weighting to the predictive tap and the specified item of the second data; activity detection means for determining an activity of the predictive tap obtained for the specified item of the second data; and weighting control means for controlling weighting applied to the predictive tap and the specified item of the second data in the learning means based on the activity of the predictive tap obtained for the specified item of the second data.

A second learning method of the present invention includes: a class-tap generating step of generating a class tap from first learning data corresponding to first data, the class tap being used for classifying a specified item of second learning data corresponding to second data used for learning coefficient source data into a class of at least one class; a classification step of classifying the specified item of the second data based on the class tap; a predictive-tap generating step of generating a predictive tap used for determining the specified item of the second data from the first learning data; a learning step of determining the coefficient source data for each of at least one class by learning a relationship between the second learning data and the first learning data for each of at least one class while applying predetermined weighting to the predictive tap and the specified item of the second data; an activity detection step of determining an activity of the predictive tap obtained for the specified item of the second data; and a weighting control step of controlling weighting applied to the predictive tap and the specified item of the second data in the learning step based on the activity of the predictive tap obtained for the specified item of the second data.

A third program of the present invention includes: a class-tap generating step of generating a class tap from first learning data corresponding to first data, the class tap being used for classifying a specified item of second learning data corresponding to second data used for learning coefficient source data into a class of at least one class; a classification step of classifying the specified item of the second data based on the class tap; a predictive-tap generating step of generating a predictive tap used for determining the specified item of the second data from the first learning data; a learning step of determining the coefficient source data for each of at least one class by learning a relationship between the second learning data and the first learning data for each of at least one class while applying predetermined weighting to the predictive tap and the specified item of the second data; an activity detection step of determining an activity of the predictive tap obtained for the specified item of the second data; and a weighting control step of controlling weighting applied to the predictive tap and the specified item of the second data in the learning step based on the activity of the predictive tap obtained for the specified item of the second data.

A third recording medium of the present invention records a program therein, the program including: a class-tap generating step of generating a class tap from first learning data corresponding to first data, the class tap being used for classifying a specified item of second learning data corresponding to second data used for learning coefficient source data into a class of at least one class; a classification step of classifying the specified item of the second data based on the class tap; a predictive-tap generating step of generating a predictive tap used for determining the specified item of the second data from the first learning data; a learning step of determining the coefficient source data for each of at least one class by learning a relationship between the second learning data and the first learning data for each of at least one class while applying predetermined weighting to the predictive tap and the specified item of the second data; an activity detection step of determining an activity of the predictive tap obtained for the specified item of the second data; and a weighting control step of controlling weighting applied to the predictive tap and the specified item of the second data in the learning step based on the activity of the predictive tap obtained for the specified item of the second data.

According to the data conversion apparatus, the data conversion method, the first program, and the first recording medium of the present invention, a class tap used for classifying a specified item of second data into a class of at least one class, and a predictive tap used for determining the specified item of the second data are generated from first data, and the specified item of the second data is classified based on the class tap. Further, a tap coefficient for the class of the specified item of the second data is obtained from tap coefficients obtained by using second learning data corresponding to the second data and first learning data corresponding to the first data and by learning the relationship between the second learning data and the first learning data for each of at least one class while applying weighting to the second learning data and the first learning data based on the activity of the predictive tap generated from the first learning data. The specified item of the second data is then determined by using the tap coefficient and the predictive tap.

According to the first learning device, the first learning method, the second program, and the second recording medium of the present invention, a class tap used for classifying a specified item of second learning data corresponding to second data, which is used for learning a tap coefficient, into a class of at least one class, and a predictive tap used for determining the specified item of the second data are generated from first learning data corresponding to first data. The specified item of the second data is then classified based on the class tap. Further, the tap coefficient for each of at least one class is determined by learning the relationship between the second learning data and the first learning data for each of at least one class while applying predetermined weighting to the specified item of the second data and the predictive tap. Meanwhile, the activity of the predictive tap obtained for the specified item of the second data is determined, and based on this activity, weighting applied to the specified item of the second data and the predictive tap is controlled.

According to the second learning device, the second learning method, the third program, and the third recording medium of the present invention, a class tap for classifying a specified item of second learning data corresponding to second data, which is used for learning coefficient source data, into a class of at least one class, and a predictive tap used for determining the specified item of the second data are generated from first learning data corresponding to first data. The specified item of the second data is then classified based on the class tap. Further, the coefficient source data for each of at least one class is determined by learning the relationship between the second learning data and the first learning data for each of at least one class while applying predetermined weighting to the specified item of the second data and the predictive tap. Meanwhile, the activity of the predictive tap obtained for the specified item of the second data is determined, and based on this activity, weighting applied to the specified item of the second data and the predictive tap is controlled.

BEST MODE FOR CARRYING OUT THE INVENTION

Figure 1A:
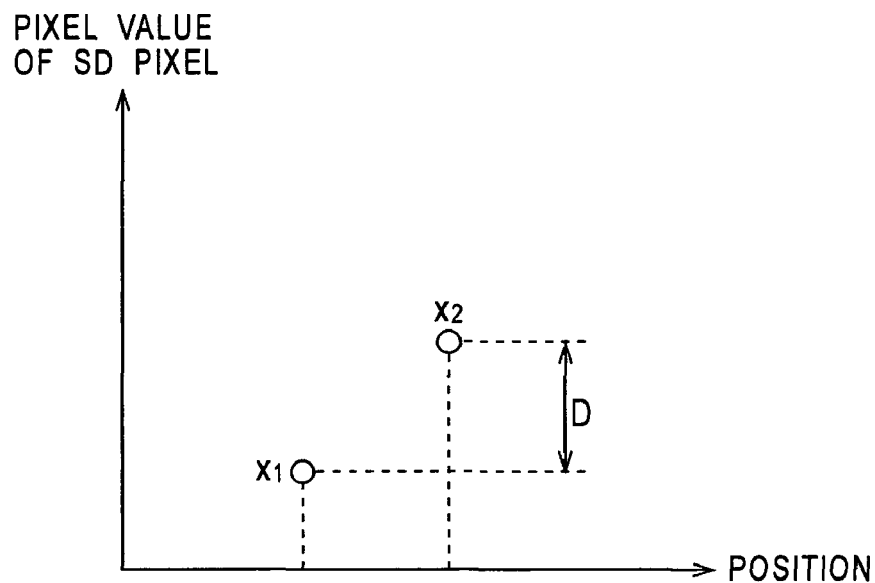
FIG. 1A illustrates a change in a predictive value in response to a displacement of a predictive tap.
Figure 1B:
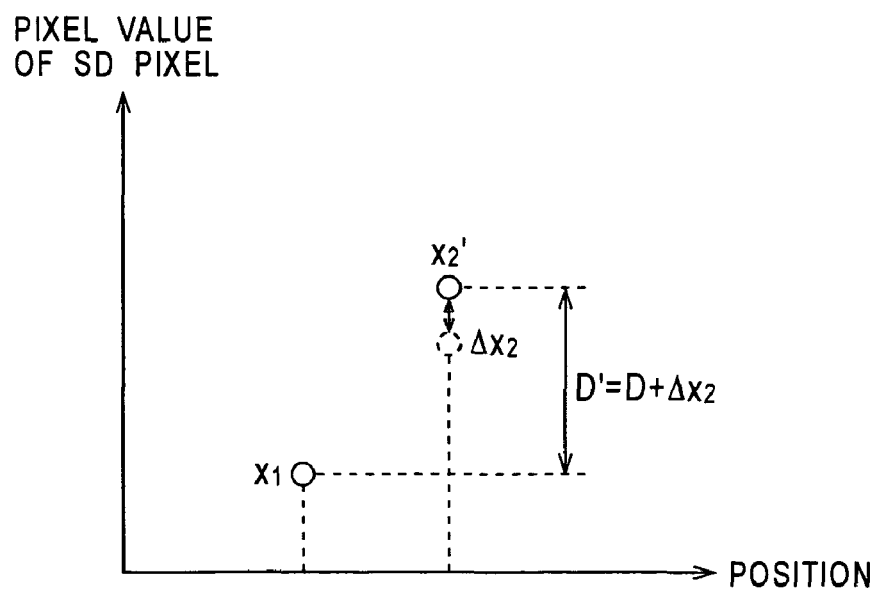
FIG. 1B illustrates a change in a predictive value in response to a displacement of a predictive tap.
Figure 2:
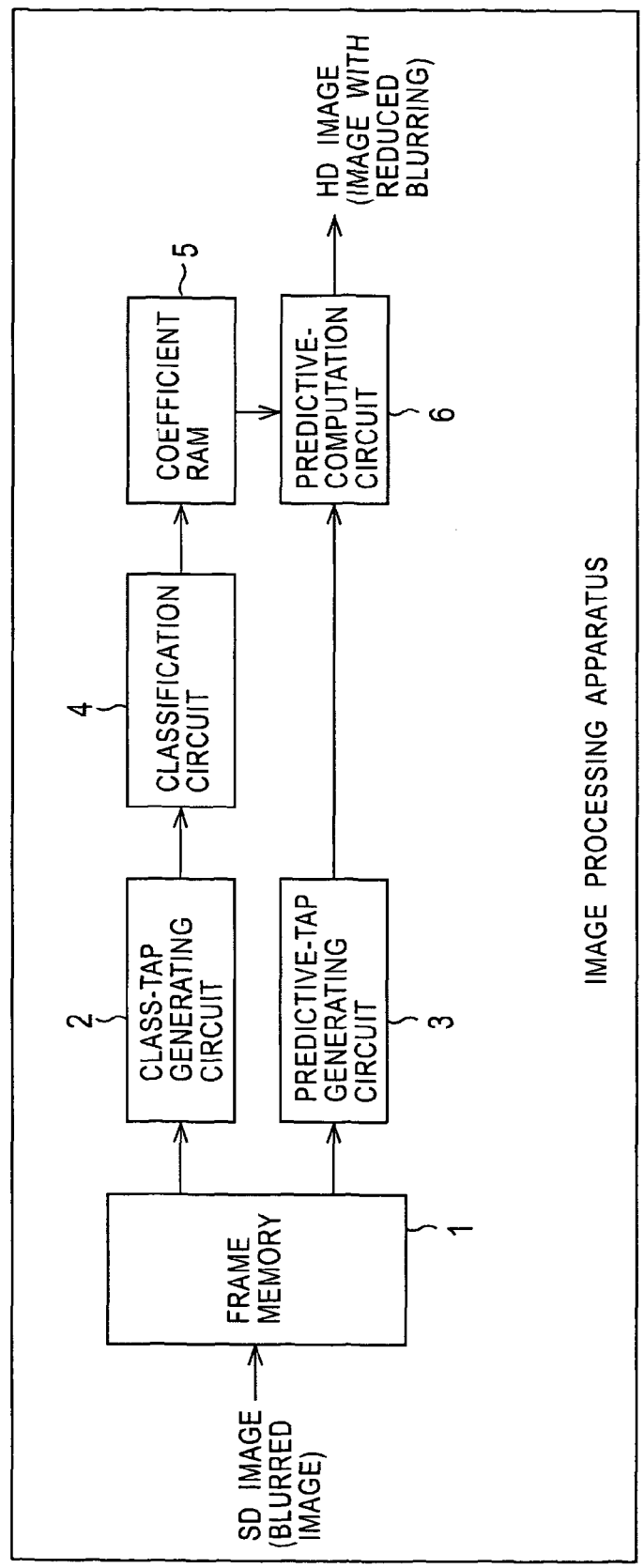
FIG. 2 is a block diagram illustrating an example of the configuration of a first embodiment of an image processing apparatus to which the present invention is applied.

FIG. 2 illustrates an example of the configuration of an embodiment of an image processing apparatus to which the present invention is applied.

In this image processing apparatus, for example, a blurred SD image is input, and classification adaptive processing is performed on the blurred SD image, thereby outputting an HD image in which blurring is sufficiently reduced regardless of the level of blurring of the original SD image.

More specifically, the image processing apparatus includes a frame memory 1, a class-tap generating circuit 2, a predictive-tap generating circuit 3, a classification circuit 4, a coefficient RAM (random access memory) 5, and a predictive-computation circuit 6. A blurred SD image is input into this image processing apparatus.

The frame memory 1 temporarily stores the SD image input into the image processing apparatus in units of, for examples, frames (or fields). In this embodiment, the frame memory 1 is able to store an SD image consisting of a plurality of frames by performing bank switching, thereby making it possible to perform image processing in real time even if the SD image input into the image processing apparatus is a moving picture.

The class-tap generating circuit 2 sets an HD pixel (ideal HD pixel from which blurring is completely eliminated from the SD pixel) to be determined by the classification adaptive processing as a specified pixel, and generates a class tap used for classifying the specified pixel from the SD image stored in the frame memory 1, thereby outputting the generated class tap to the classification circuit 4. That is, the class-tap generating circuit 2 extracts, for example, a plurality of SD pixels positioned spatially or temporally close to the specified pixel, from the SD image stored in the frame memory 1, and sets the extracted SD pixels as the class tap, thereby outputting the class tap to the classification circuit 4.

The predictive-tap generating circuit 3 generates a predictive tap to be used for determining the predictive value of the specified pixel in the predictive-computation circuit 6 from the SD image stored in the frame memory 1, and supplies the generated predictive tap to the predictive-computation circuit 6. That is, the class-tap generating circuit 2 extracts, for example, a plurality of SD pixels positioned spatially or temporally close to the specified pixel, from the SD image stored in the frame memory 1, and sets the extracted SD pixels as the predictive tap, thereby outputting the predictive tap to the predictive-computation circuit 6.

In this embodiment, the predictive tap and the class tap (hereinafter sometimes simply referred to as "taps") are formed of the SD pixels themselves. However, motion vectors may be detected from the SD image, and a tap may also be formed of the motion vectors as well as the SD pixels.

The SD pixels serving as the predictive tap and the SD pixels serving as the class tap may be the same or may be different. That is, the predictive tap and the class tap may be independently formed (generated).

The classification circuit 4 classifies the specified pixel based on the class tap output from the class-tap generating circuit 2, and supplies the class code corresponding to the class of the specified pixel to the coefficient RAM 5 as the address. That is, the classification circuit 4 performs one-bit ADRC (Adaptive Dynamic Range Coding) processing on the class tap output from the class-tap generating circuit 2, and outputs the resulting ADRC code to the coefficient RAM 5 as the class code.

In K-bit ADRC processing, the maximum value MAX and the minimum value MIN of the pixel values of the SD pixels forming the class tap are detected, and DR=MAX−MIN is set to be the local dynamic range. Then, based on this dynamic range DR, the SD pixels forming the class tap are re-quantized into K bits. That is, the minimum value MIN is subtracted from the pixel value of each SD pixel forming the class tap, and the resulting value is divided (quantized) by DR/2K. Accordingly, when performing one-bit ADRC processing on the class tap, the pixel value of each SD pixel forming the class tap is re-quantized into one bit. In this case, the one-bit pixel values of the individual SD pixels forming the class tap are arranged into a bit stream in a predetermined order, and the bit stream is output as the ADRC code. The classification processing may be performed by another technique, for example, the SD pixels forming the class tap may be considered as vector components, and the vectors may be quantized. In the classification processing, only one class may be used, in which case, the classification circuit 4 outputs fixed class code regardless of which class tap is supplied.

The coefficient RAM 5 stores tap coefficients obtained by using supervisor data used as supervisors for learning, which is HD image data, and learner data used as learners for learning, which is SD image data, and by learning the relationships between the supervisor data and the learner data for at least one class while applying a weight to the supervisor data and the learner data based on the activity of the predictive tap generated from the learner data. Upon receiving the class code from the classification circuit 4, the coefficient RAM 5 reads the tap coefficient stored at the address corresponding to the class code so as to obtain the tap coefficient of the class of the specified pixel, and supplies it to the predictive-computation circuit 6. Details of the learning method for tap coefficients are described below.

The predictive-computation circuit 6 performs computation expressed by equation (1) by using the tap coefficients $w_1$, $w_2$, . . . for the class of the specified pixel supplied from the coefficient RAM 5 and the pixels values $x_1$, $x_2$, . . . of the SD pixels forming the predictive tap from the predictive-tap generating circuit 3 so as to determine the predictive value of the specified pixel y, thereby outputting the predictive value as the pixel value of the HD pixel with reduced blurring.

The image conversion processing for converting an SD image into an HD image performed by the image processing apparatus shown in FIG. 2 is described below with reference to the flowchart of FIG. 3.

An SD image (moving picture) to be subjected to image conversion processing is supplied to the frame memory 1 sequentially in units of frames, and the frames of the SD image are sequentially stored in the frame memory 1.

In step S1, the class-tap generating circuit 2 selects an HD pixel which has not been determined as a specified pixel, and the process proceeds to step S2.

In step S2, the class-tap generating circuit 2 and the predictive-tap generating circuit 3 extract a plurality of SD pixels positioned spatially or temporally close to the specified pixel from the SD image stored in the frame memory 1 so as to generate a class tap and a predictive tap, respectively, thereby supplying them to the classification circuit 4 and the predictive-computation circuit 6, respectively.

The process then proceeds to step S3 in which the classification circuit 4 classifies the specified pixel based on the class tap supplied from the class-tap generating circuit 2, and outputs the class code representing the resulting class of the specified pixel to the coefficient RAM 5 as the address. The process then proceeds to step S4. In step S4, the coefficient RAM 5 reads the tap coefficient stored at the address corresponding to the class code supplied from the classification circuit 4 so as to obtain the tap coefficient for the class of the specified pixel, and supplies it to the predictive-computation circuit 6.

Subsequently, in step S5, the predictive-computation circuit 6 performs computation expressed by equation (1) by using the predictive tap supplied from the predictive-tap generating circuit 3 and the tap coefficient supplied from the coefficient RAM 5 so as to determine the predictive value of the HD pixel y, which is the specified pixel. Then, the process proceeds to step S6.

The predictive-computation circuit 6 stores the HD pixel obtained in step S5 until HD pixels for one frame are determined, and when HD pixels for one frame are determined, an HD image for one frame formed of the HD pixels is output.

In step S6, the class-tap generating circuit 2 determines whether there is an HD pixel that has not been determined as a specified pixel. If it is determined that there is an unspecified HD pixel, the process returns to step S1, and processing similar to the above-described processing is repeated.

If it is determined in step S6 that there is no HD pixel that has not been determined as the specified pixel, the process is completed.

Figure 4:
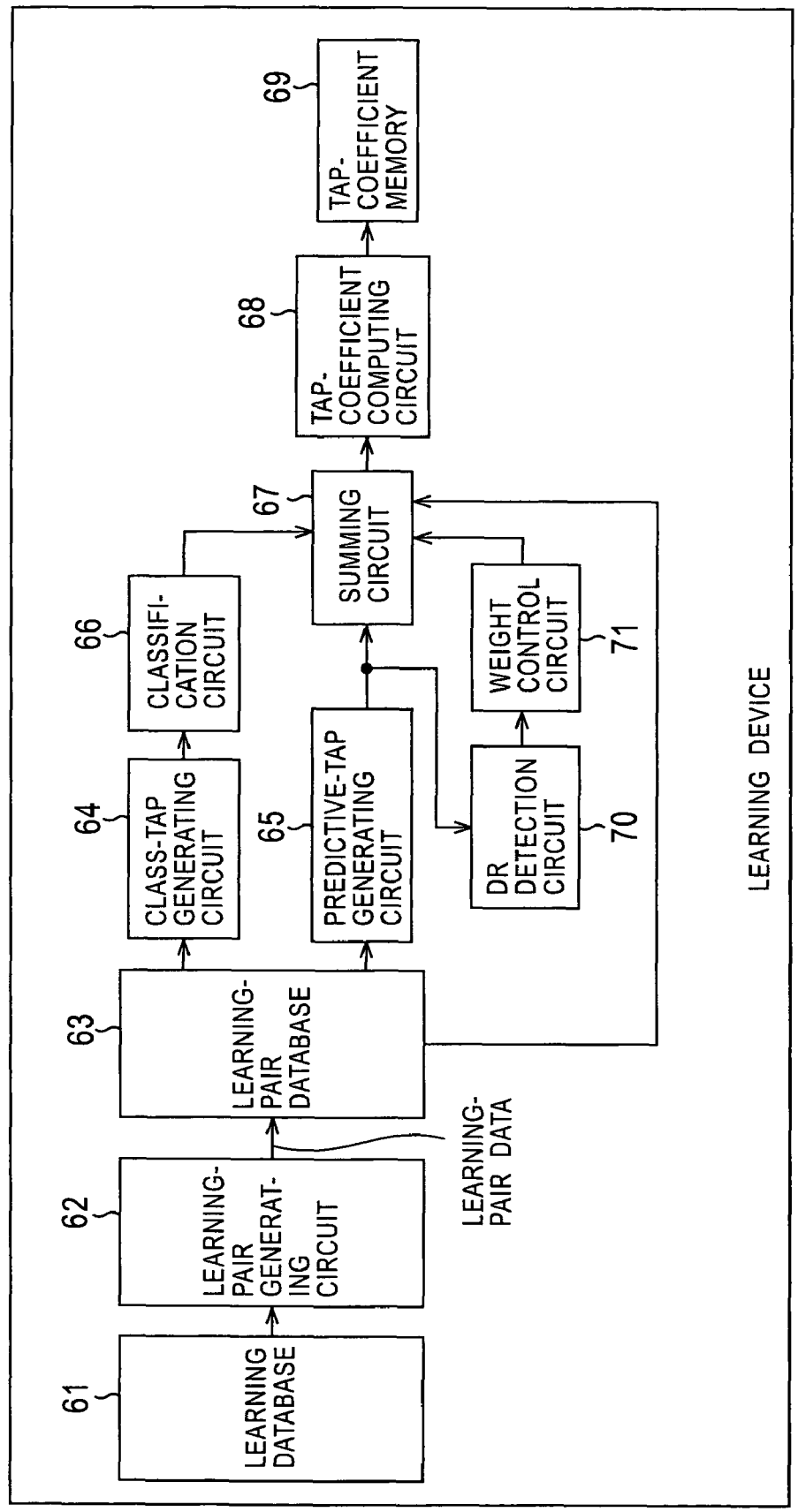
FIG. 4 is a block diagram illustrating an example of the configuration of a first embodiment of a learning device to which the present invention is applied.

FIG. 4 illustrates an example of the configuration of an embodiment of a learning device that conducts learning for determining a tap coefficient for each class to be stored in the coefficient RAM 5 shown in FIG. 2.

In a learning database 61, for example, HD image data, as image data for learning tap coefficients is stored.

A learning-pair generating circuit 62 generates learning-pair data as a set of supervisor data and learner data used for learning tap coefficients from the learning image data stored in the learning database 61, and supplies the learning-pair data to a learning-pair database 63.

That is, the learning-pair generating circuit 62 reads the learning image data stored in the learning database 61, and sets the HD image data, which is the learning image data, directly as supervisor data. The HD image obtained in the image processing apparatus shown in FIG. 2 is equivalent to the image quality of the HD image data used as the supervisor data in the learning device shown in FIG. 4.

The learning-pair generating circuit 62 also decreases the image quality of the HD image data as the supervisor data, and more specifically, the learning-pair generating circuit 62 reduces, for example, the number of pixels of the HD image data as the supervisor data, and then filters the HD image data having a reduced number of pixels with a LPF (low pass filter), thereby generating learner data, which is the SD image data, determined by blurring the HD image data as the supervisor data. The SD image data as the learner data must coincide with the image quality of the SD image data to be processed in the image processing apparatus shown in FIG. 2.

The learning-pair generating circuit 62 generates the supervisor data and the corresponding learner data generated from the supervisor data as described above, and supplies a set of the supervisor data and the learner data to the learning-pair database 63 as the learning-pair data.

The learning-pair database 63 temporarily stores the learning-pair data supplied from the learning-pair generating circuit 62.

By using the SD pixels forming the SD image as the learner data of the learning-pair data stored in the learning-pair database 63, a class-tap generating circuit 64 and a predictive-tap generating circuit 65 generate a class tap and a predictive tap, respectively, having the same tap structure as that in the class-tap generating circuit 2 or the predictive-tap generating circuit 3 shown in FIG. 2, for the HD pixel of the supervisor data as the specified pixel, and supply the class tap and the predictive tap to a classification circuit 66 and a summing circuit 67, respectively.

The classification circuit 66, which is configured similarly to the classification circuit 4 shown in FIG. 2, classifies the specified pixel based on the class tap supplied from the class-tap generating circuit 64, and supplies the class code representing the class of the specified pixel to the summing circuit 67.

The summing circuit 67 and a tap-coefficient computing circuit 68 conduct learning for the relationship between the supervisor data and the learner data as the learning-pair data stored in the learning-pair database 63 for each class supplied from the classification circuit 66 while applying a weight to the supervisor data as the specified pixel and the predictive tap supplied from the predictive-tap generating circuit 65 under the control of a weight control circuit 71, thereby determining a tap coefficient for each class.

That is, the summing circuit 67 performs summation in equations (8) for the predictive taps supplied from the predictive-tap generating circuit 65 and the specified HD pixels of the learning-pair data stored in the learning-pair database 63 for each class code output from the classification circuit 66.

More specifically, the summing circuit 67 performs calculations corresponding to multiplication $(x_{n,k} x_{n',k})$ of the SD pixels and summation ($\Sigma$) in the matrix at the left side of equations (8) by using the SD pixels $x_{n,k}$ forming the predictive tap for each class corresponding to the class code supplied from the classification circuit 66.

The summing circuit 67 also performs calculations corresponding to multiplication $(x_{n,k} y_k)$ of the SD pixels $x_{n,k}$ and the specified pixel $y_k$ and summation ($\Sigma$) in the vector at the right side of equations (8) by using the SD pixels $x_{n,k}$ forming the predictive tap and the specified HD pixel $y_k$ as the supervisor data for each class corresponding to the class code supplied from the classification circuit 66.

When performing summation in equations (8) for the predictive taps and the specified pixels, the summing circuit 67 applies a weight to the predictive taps and the specified pixels under the control of the weight control circuit 71. Accordingly, when a weight applied to the k-th sample specified pixel $y_k$ and the predictive tap $x_{n,k}$ generated for the specified pixel $y_k$ is indicated by $h_k$, the summing circuit 67 performs summation in equations (20), which is obtained by multiplying the individual components in the matrix at the left side and in the vector at the right side in equations (8) by the weight $h_k$.

$$\begin{bmatrix} \left(\sum_{k=1}^{K} x_{1,k}x_{1,k}h_k\right) & \left(\sum_{k=1}^{K} x_{1,k}x_{2,k}h_k\right) & \cdots & \left(\sum_{k=1}^{K} x_{1,k}x_{N,k}h_k\right) \\ \left(\sum_{k=1}^{K} x_{2,k}x_{1,k}h_k\right) & \left(\sum_{k=1}^{K} x_{2,k}x_{2,k}h_k\right) & \cdots & \left(\sum_{k=1}^{K} x_{2,k}x_{N,k}h_k\right) \\ \vdots & \vdots & \ddots & \vdots \\ \left(\sum_{k=1}^{K} x_{N,k}x_{1,k}h_k\right) & \left(\sum_{k=1}^{K} x_{N,k}x_{2,k}h_k\right) & \cdots & \left(\sum_{k=1}^{K} x_{N,k}x_{N,k}h_k\right) \end{bmatrix} \begin{bmatrix} w_1 \\ w_2 \\ \vdots \\ w_N \end{bmatrix} = \begin{bmatrix} \left(\sum_{k=1}^{K} x_{1,k}y_k h_k\right) \\ \left(\sum_{k=1}^{K} x_{2,k}y_k h_k\right) \\ \vdots \\ \left(\sum_{k=1}^{K} x_{N,k}y_k h_k\right) \end{bmatrix} \quad (20)$$

That is, the summing circuit 67 performs calculations of multiplication ($x_{n,k}x_{n',k}$) of the SD pixels and performs weighting ($x_{n,k}x_{n',k}h_k$) by applying the weight $h_k$ by using the SD pixels $x_{n,k}$ forming the predictive tap, and of summation ($\Sigma$) in the matrix at the left side of equations (20) for each class corresponding to the class code supplied from the classification circuit 66.

The summing circuit 67 also performs calculations of multiplication ($x_{n,k}y_k$) of the SD pixels $x_{n,k}$ and the specified pixel $y_k$, and performs weighting ($x_{n,k}y_k h_k$) by applying the weight $h_k$ by using the SD pixels $x_{n,k}$ and the specified HD pixel $y_k$ Of the supervisor data, and of summation (Z) in the vector at the right side of equations (20) for each class corresponding to the class code supplied from the classification circuit 66.

Figure 5:
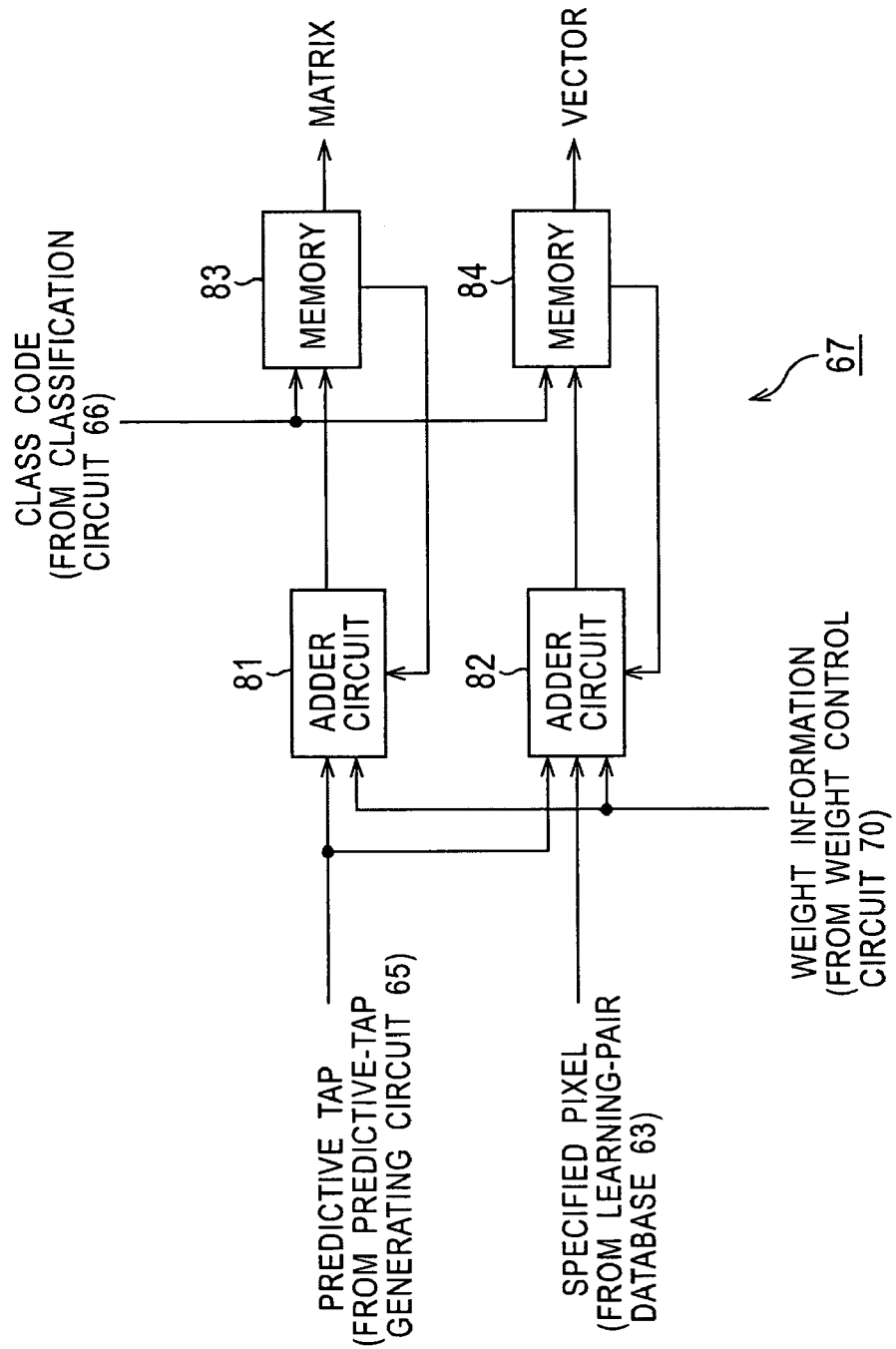
FIG. 5 is a block diagram illustrating an example of the configuration of a summing circuit 67.

FIG. 5 illustrates an example of the configuration of the summing circuit 67 shown in FIG. 4.

A predictive tap $x_{n,k+1}$ of a new specified pixel $y_{k+1}$ is supplied to an adder circuit 81 from the predictive-tap generating circuit 65, and weighting information indicating a weight $h_{k+1}$ applied to the new pixel value $y_{k+1}$ and the predictive tap $x_{n,k+1}$ is supplied to the adder circuit 81 from the weight control circuit 70. A memory 83 stores the component ($\Sigma x_{n,k}x_{n',k}h_k$) in the matrix at the left side in equations (20) obtained for the supervisor data, which is the previous specified pixel $y_k$. The class code of the new specified pixel $y_{k+1}$ output from the classification circuit 66 is supplied to the memory 83. Then, the memory 83 reads the component ($\Sigma x_{n,k}x_{n',k}h_k$) in the matrix at the left side in equations (20) corresponding to the class code, and supplies the component to the adder circuit 81.

The adder circuit 81 calculates the component $x_{n,k+1}x_{n',k+1}h_{k+1}$ in the matrix at the left side of equations (20) by using the predictive tap $x_{n,k+1}$ and the weight $h_{k+1}$ of the new specified pixel $y_{k+1}$, and adds the calculated component to the component $\Sigma x_{n,k}x_{n',k}h_k$ supplied from the memory 83, thereby determining a new component $\Sigma x_{n,k+1}x_{n',k+1}h_{k+1}$. Then, the adder circuit 81 supplies the new component $\Sigma x_{n,k+1}x_{n',k+1}h_{k+1}$ to the memory 83, and the memory 83 stores it by overwriting the previous component $\Sigma x_{n,k}x_{n',k}h_k$ by the new component.

The predictive tap $x_{n,k+1}$ of the new specified pixel $y_{k+1}$ from the predictive-tap generating circuit 65, and weighting information indicating the weight $h_{k+1}$ applied to the new pixel value $y_{k+1}$ and the predictive tap $x_{n,k+1}$ from the weight control circuit 70 are also supplied to an adder circuit 82. A memory 84 stores the component $\Sigma x_{n,k}y_k h_k$ in the vector at the right side in equations (20) obtained for the supervisor data, which is the previous specified pixel $y_k$. The class code of the new specified pixel $y_{k+1}$ output from the classification circuit 66 is also supplied to the memory 84. Then, the memory 84 reads the component $\Sigma x_{n,k}y_k h_k$ in the vector at the right side in equations (20) corresponding to the class code, and supplies the component to the adder circuit 82.

The adder circuit 82 reads the new specified pixel $y_{k+1}$ from the learning-pair database 63, and calculates the component $x_{n,k+1}y_{k+1}h_{k+1}$ in the vector at the right side of equations (20) by using the specified pixel $y_{k+1}$, the predictive tap $x_{n,k+1}$, and the weight $h_{k+1}$. The adder circuit 82 then adds the calculated component $x_{n,k+1}y_{k+1}h_{k+1}$ to the component $\Sigma x_{n,k}y_k h_k$ supplied from the memory 84, thereby determining a new component $\Sigma x_{n,k+1}y_{k+1}h_{k+1}$. Then, the adder circuit 82 supplies the new component $\Sigma x_{n,k+1}y_{k+1}h_{k+1}$ to the memory 84, and the memory 84 stores it by overwriting the previous component $\Sigma x_{n,k}y_k h_k$ by the new component.

Returning to FIG. 4, the summing circuit 67 performs the above-described summation for all the items of the supervisor data of the learning-pair data stored in the learning-pair database 63 so as to establish the normal equations expressed by equations (20) for each class, and then supplies the normal equations (the components in the matrix at the left side in equations (20) stored in the memory 83 shown in FIG. 5 and the components of the vector at the right side in equations (20) stored in the memory 84) to the tap-coefficient computing circuit 68.

Upon receiving the normal equations expressed by equations (20) for each class from the summing circuit 67, the tap-coefficient computing circuit 68 solves the normal equations to determine the tap coefficient for each class, and outputs it.

A tap-coefficient memory 69 stores the tap coefficient for each class supplied from the tap-coefficient computing circuit 68.

A DR (dynamic range) detection circuit 70 detects, for example, the dynamic range, indicating the activity of the predictive tap of the specified pixel output from the predictive-tap generating circuit 65, and supplies the detected dynamic range to the weight control circuit 71. That is, the DR detection circuit 70 subtracts the minimum value from the maximum value of the SD pixels forming the predictive tap, and supplies the resulting value to the weight control circuit 71 as the dynamic range.

The weight control circuit 71 controls a weight to be applied to the specified pixel and the corresponding predictive tap by the summing circuit 67 based on the dynamic range supplied from the DR detection circuit 70 as the activity of the predictive tap.

More specifically, the weight control circuit 71 stores predetermined weighting characteristics in which the activities and the weights h are correlated with each other. The weight control circuit 71 then determines the weight h corresponding to the dynamic range of the predictive tap supplied from the DR detection circuit 70 according to the weighting characteristic, and supplies the weighting information indicating an instruction to perform weighting on the specified pixel and the predictive tap by using the determined weight h to the summing circuit 67.

Figure 6:
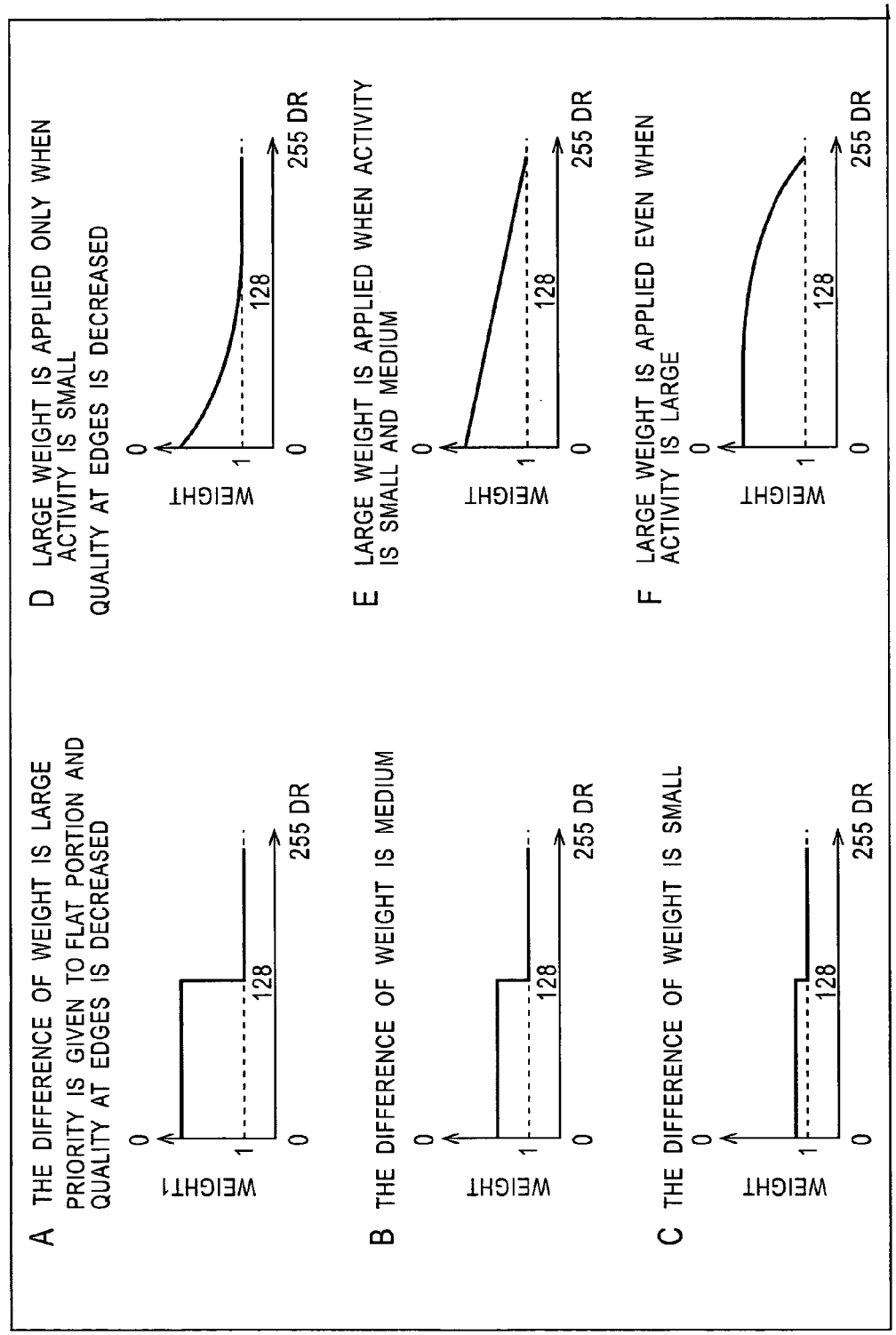
FIG. 6 are diagrams illustrating examples of weighting characteristics.

Examples of the weighting characteristics are shown in FIG. 6.

In FIG. 6, the horizontal axis indicates the dynamic range of a predictive tap, and the vertical axis represents the weight. It is assumed in FIG. 6 that an SD pixel has 8 bits, and thus, the dynamic range is an integer ranging from 0 to 255.

In FIG. 6, six weighting characteristics are shown in FIGS. 6A through 6F. The weighting characteristics indicated in FIGS. 6A through 6C are weights in the form of a stepwise function: the weight is greater than 1 when the dynamic range is from 0 to 127, and the weight is 1 when the dynamic range is from 128 to 255. In the weighting characteristic in FIG. 6A, the difference between the weight when the dynamic range is 0 to 127 and the weight when the dynamic range is 128 to 255 is large. In the weighting characteristic in FIG. 6B, the difference between the weight when the dynamic range is 0 to 127 and the weight when the dynamic range is 128 to 255 is a medium. In the weighting characteristic in FIG. 6C, the difference between the weight when the dynamic range is 0 to 127 and the weight when the dynamic range is 128 to 255 is small.

In the weighting characteristics shown in FIGS. 6D through 6F, as the dynamic range is smaller, the weight becomes larger from 1, and as the dynamic range is larger, the weight becomes closer to 1. In the weighting characteristic shown in FIG. 6D, as the dynamic range is larger, the weight becomes smaller exponentially. In the weighting characteristic shown in FIG. 6E, the weight becomes smaller in proportion to the dynamic range. In the weighting characteristic shown in FIG. 6F, when the dynamic range is small, the weight gradually changes, and when the dynamic range is large, the weight sharply changes.

The weighting characteristics stored in the weight control circuit 71 are not restricted to those shown in FIG. 6.

In all of the weighting characteristics shown in FIG. 6, the weight becomes larger when the dynamic range is smaller. The reason for this is as follows.

As discussed above, when the dynamic range of the predictive tap is large, the influence of variations in the predictive tap on the resulting HD pixel can be suppressed because of the DR masking effect. On the other hand, when the dynamic range of the predictive tap is small, the DR masking effect does not function, and variations in the predictive tap considerably influences the resulting HD pixel.

Accordingly, when the dynamic range of the predictive tap is small, the prediction precision of the predictive value of the HD pixel y determined in equation (1) must be increased compared to when the dynamic range of the predictive tap is large. That is, when the dynamic range of the predictive tap is small, learning for the predictive tap $w_n$ in equation (1) should be conducted so that the predictive error $e_k$ expressed by equation (3) becomes smaller compared to when the dynamic range of the predictive tap is large. This can be implemented by performing learning by applying a larger weight when the dynamic range of the predictive tap is small compared to when the dynamic range of the predictive tap is large. Accordingly, the weighting characteristics stored in the weight control circuit 71 are such that the weight when the dynamic range is small is larger than that when the dynamic range is large.

Learning processing for determining a tap coefficient for each class performed in the learning device shown in FIG. 4 is described below with reference to the flowchart of FIG. 7.

In step S21, the learning-pair generating circuit 62 reads learning image data from the learning database 61 so as to generate supervisor data and learner data. Also in step S21, the learning-pair generating circuit 62 generates learning-pair data by forming a set of the supervisor data and the learner data, and supplies the learning-pair data to the learning-pair database 63 and stores it therein.

The process then proceeds to step S22. In step S22, the class-tap generating circuit 64 selects one of the HD pixels (which has not been determined as the specified pixel) forming the supervisor data of the learning-pair data stored in the learning-pair database 63, and the process proceeds to step S23. In step S23, the class-tap generating circuit 64 and the predictive-tap generating circuit 65 generate a class tap and a predictive tap, respectively, for the specified pixel from the SD pixels forming the learner data stored in the learning-pair database 63, and supplies the generated class-tap and predictive-tap to the classification circuit 66 and the summing circuit 67, respectively. The process then proceeds to step S24. The predictive-tap generating circuit 65 also supplies the predictive tap to the DR detection circuit 70.

In step S24, as in the classification circuit 4 shown in FIG. 2, the classification circuit 66 classifies the specified pixel by using the class tap supplied from the class-tap generating circuit 64, and supplies the class code indicating the resulting class of the specified pixel to the summing circuit 67. The process then proceeds to step S25.

In step S25, the DR detection circuit 70 detects the dynamic range of the predictive tap supplied from the predictive-tap generating circuit 65, and supplies the detected dynamic range to the weight control circuit 71. The process then proceeds to step S26. In step S26, the weight control circuit 71 determines the weight to be applied to the specified pixel and the predictive tap based on the dynamic range supplied from the DR detection circuit 70, and supplies weighting information indicating the weight to the summing circuit 67.

The process then proceeds to step S27. In step S27, the summing circuit 67 performs summation in equations (20) for the predictive tap supplied from the predictive-tap generating circuit 65, the supervisor data as the specified pixel stored in the learning-pair database 63, and the weight indicated by the weighting information supplied from the weight control circuit 71 according to each class of the specified pixel represented by the class code supplied from the classification circuit 67. Then, the process proceeds to step S28.

In step S28, the class-tap generating circuit 64 determines whether there is an undetermined HD pixel as the specified pixel in the supervisor data stored in the learning-pair database 63. If it is determined in step S28 that there is an unspecified HD pixel in the supervisor data stored in the learning-pair database 63, the process returns to step S22, and processing similar to the above-described processing is repeated.

If it is determined in step S28 that there is no HD pixel data that has not been determined as the specified pixel in the supervisor data stored in the learning-pair database 63, the summing circuit 67 supplies normal equations expressed by equations (20) obtained for each class as a result of performing summation in step S27 to the tap-coefficient computing circuit 68. The process then proceeds to step S29.

In step S29, the tap-coefficient computing circuit 68 solves the normal equations expressed by (20) for each class supplied from the summing circuit 67 so as to determine a tap coefficient for each class, and supplies it to the tap-coefficient memory 60 and stores it therein. The process is then completed.

In the above-described learning processing for tap coefficients, there may be a class for which a required number of normal equations for determining a tap coefficient cannot be obtained depending on learning image data prepared. For such a class, a default tap coefficient, for example, may be output. Alternatively, if there is any class for which a required number of normal equations for determining a tap coefficient cannot be obtained, new learning image data may be prepared to re-conduct learning for tap coefficients. The same applies to learning for coefficient source data, which is described below.

As described above, supervisor data and learner data are used, and the relationship between the supervisor data and the learner data is learned for each class while applying a weight to the supervisor data and the learner data based on the dynamic range of a predictive tap generated from the learner data, thereby determining a tap coefficient for each class. It is thus possible to obtain tap coefficients for increasing prediction precision over the entire dynamic ranges of the predictive taps.

In the image processing apparatus shown in FIG. 2, such tap coefficients are stored in the coefficient RAM 5, and SD image data is converted into HD image data by using the tap coefficients. Accordingly, there is no difference of the image quality of a resulting HD image between when a predictive tap has a large dynamic range and when a predictive tap has a small dynamic range, thereby making it possible to provide higher-quality image data to the user.

In the above-described example, the dynamic range of the predictive tap is used as the activity of the predictive tap. However, as the activity, the elements disclosed in, for example, Japanese Unexamined Patent Application Publication Nos. 11-27564, 2000-115721, 2000-299862, and 2000-348019, and Japanese Patent Application No. 2000-241803 may be used.

According to the method disclosed in Japanese Unexamined Patent Application Publication No. 11-27564, the self-correlation of SD pixels forming a predictive tap is calculated as the activity. According to the method disclosed in Japanese Unexamined Patent Application Publication No. 2000-115721, the number of SD pixels forming a predictive tap is reduced and the resulting SD pixels are interpolated. Then, the absolute sum of the errors between the interpolated SD pixels and the original pixels is calculated as the activity. According to the method disclosed in Japanese Unexamined Patent Application Publication No. 2000-299862, the variance of orthogonal transform coefficients, for example, DCT coefficients, of SD pixels forming a predictive tap is calculated as the activity. According to the method disclosed in Japanese Unexamined Patent Application Publication No. 2000-348019, the standard deviation, the variance, the absolute sum of the differences, or the absolute sum of the differences of the difference values (second-order differentiation) of SD pixels forming a predictive tap is calculated as the activity. According to the method disclosed in Japanese Patent Application No. 2000-241803, the motion of an SD image in a predictive tap is calculated as the activity.

In the above-described example, the weight control circuit 71 controls the weight $h_k$ in equations (20) determined in the summing circuit 67 so as to apply weighting to the specified pixels and the predictive taps. Alternatively, the weight control circuit 71 may control the number of summations for the specified pixels and the predictive taps in equations (8), thereby making it possible to apply weighting to the specified pixels and the predictive taps, substantially in the same manner of controlling the weight $h_k$ in equations (20). The same applies to weight control circuits 71A through 71C in FIG. 10 and a weight control circuit 126 in FIG. 14, which are described below.

As described above, in the learning device shown in FIG. 4, the relationship between the supervisor data and the learner data is learned for each class while applying a weight to the supervisor data and the learner data based on the dynamic range of a predictive tap generated from the supervisor data, thereby determining a tap coefficient for each class. It is thus possible to obtain tap coefficients for increasing the prediction precision over the entire dynamic ranges of the predictive taps. By converting SD image data into HD image data by using such tap coefficients in the image processing apparatus shown in FIG. 2, qualitatively high-quality image data obtained as a result of allowing the above-described DR masking effect to function over the dynamic ranges of the predictive taps to substantially an equal level (i.e., image data which is aesthetically pleasant for the user, though it is not necessarily quantitatively high-quality image data having a high S/N (signal to noise ratio)) can be provided to the user.

However, each user has its own favorite image quality, and thus, if the user is able to adjust the level of the DR masking effect, he/she can advantageously obtain an image of a desired quality.

Figure 8:
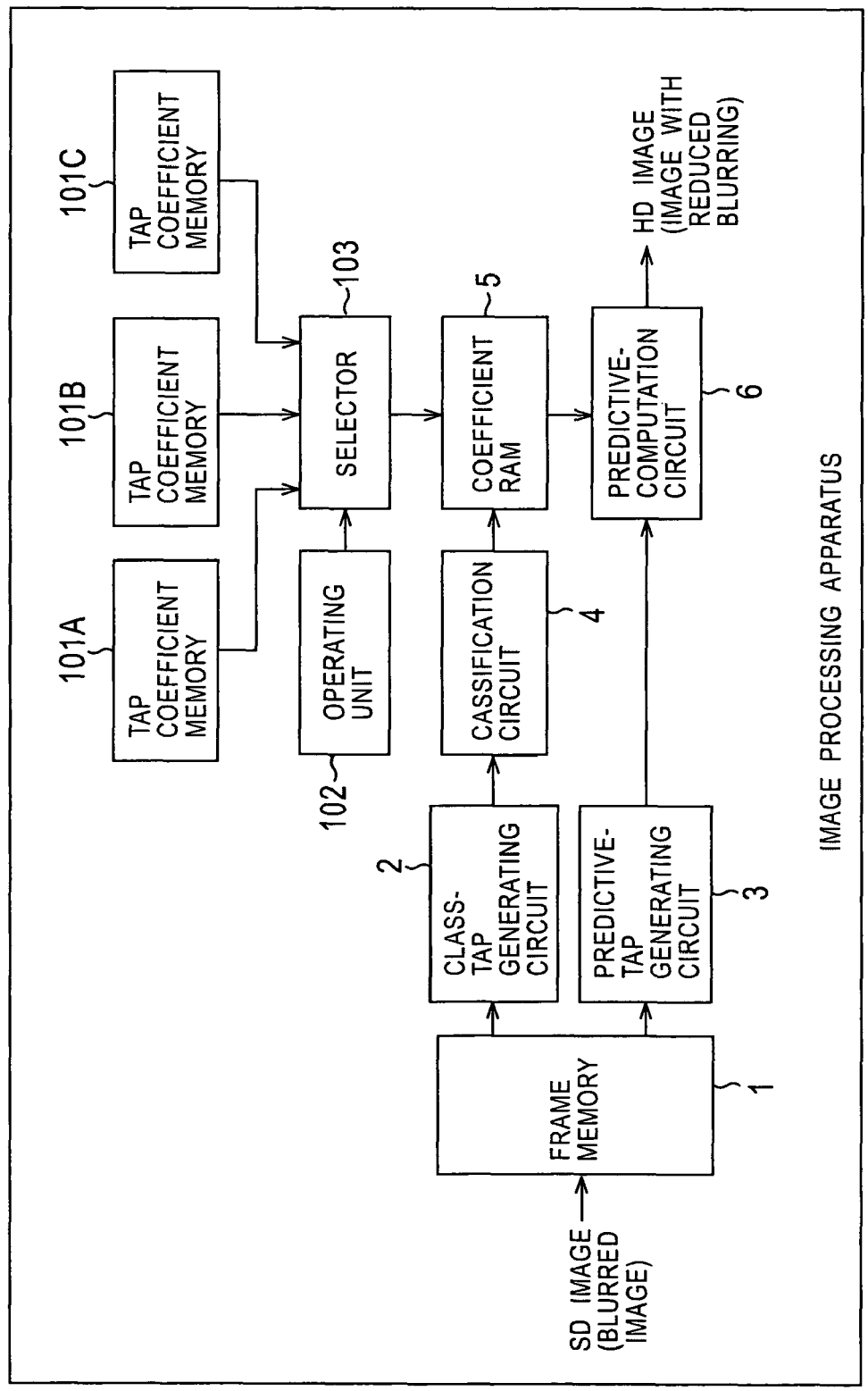
FIG. 8 is a block diagram illustrating an example of the configuration of a second embodiment of the image processing apparatus to which the present invention is applied.

FIG. 8 illustrates an example of the configuration of an embodiment of an image processing apparatus that enables the user to adjust the level of the DR masking effect. In FIG. 8, the elements corresponding to those shown in FIG. 2 are designated with like reference numerals, and an explanation thereof is thus omitted. That is, the configuration of the image processing apparatus in FIG. 8 is similar to that of the image processing apparatus shown in FIG. 2, except that new elements, i.e., three tap coefficient memories 101A through 101C, an operation unit 102, and a selector 103, are provided.

In the three tap coefficient memories 101A through 101C, tap coefficients for the individual classes are stored. The tap coefficients stored in the tap coefficient memories 101A through 101C are tap coefficients corresponding to three different types of weights obtained by learning the relationships between the supervisor data and the learner data by applying the three different types of weights in the learning device shown in FIG. 4. That is, the tap coefficients stored in the tap coefficient memories 101A through 101C are obtained by conducting learning while storing the three different types of weights in the weight control circuit 71 of the learning device shown in FIG. 4.

The operation unit 102 is operated by the user, and supplies an operation signal corresponding to the operation to the selector 103.

The selector 103 selects one of the tap coefficient memories 101A through 101C according to the operation signal from the operation unit 102, and reads the tap coefficient stored in the selected tap coefficient memory. The selector 103 then supplies the read tap coefficient to the coefficient RAM 5, and stores it therein by overwriting the previous tap coefficient by it.

Accordingly, in the image processing apparatus shown in FIG. 8, SD image data can be converted into HD image data by using the tap coefficient corresponding to the weighting characteristic in accordance with the operation performed by the user on the operation unit 102.

Figure 9:
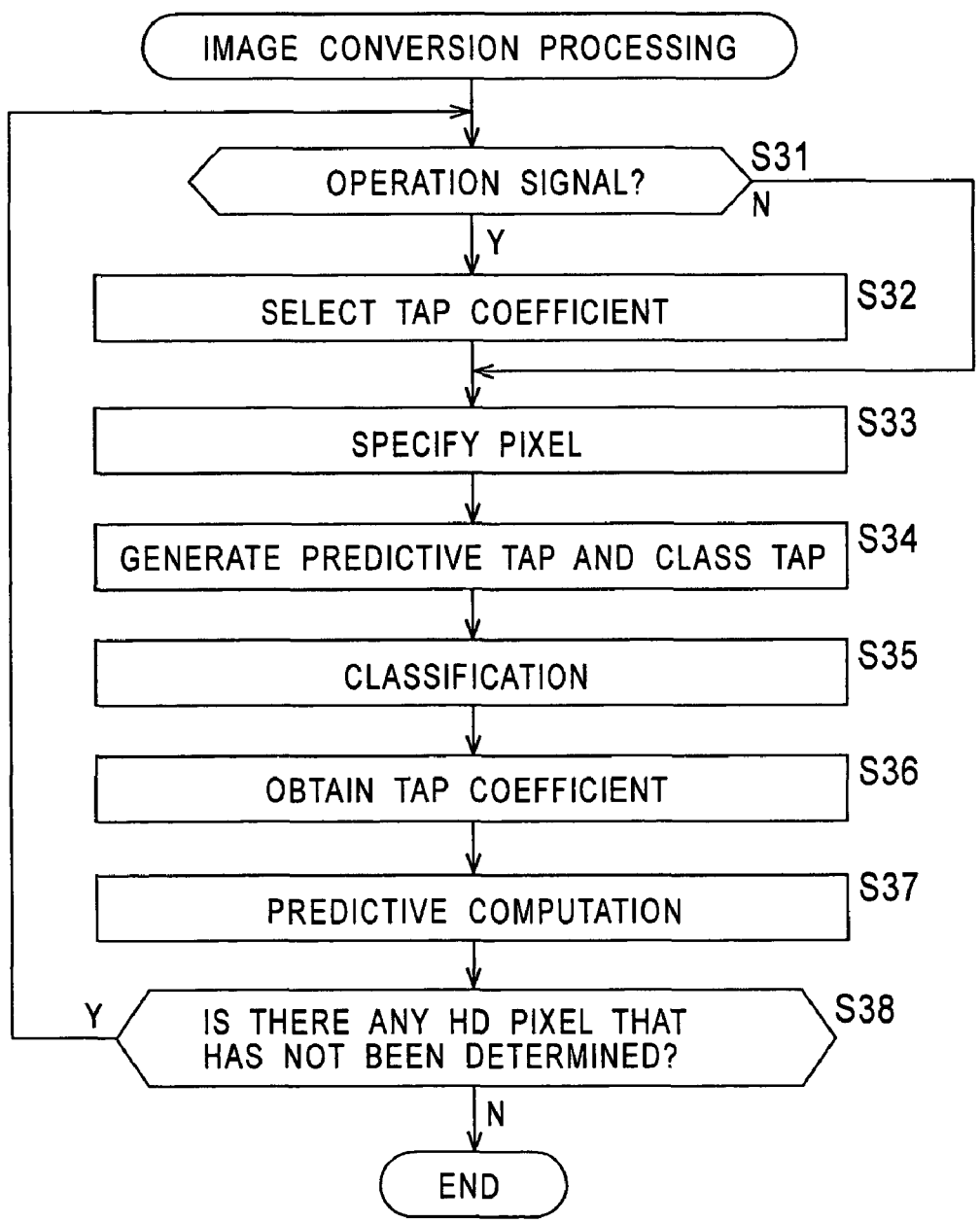
FIG. 9 is a flowchart illustrating processing performed by the image processing apparatus.

Image conversion processing for converting an SD image into an HD image performed by the image processing apparatus shown in FIG. 8 is described below with reference to the flowchart of FIG. 9.

An SD image (moving picture) to be subjected to image conversion processing is supplied to the frame memory 1 sequentially in units of frames. The frames of the SD image supplied are sequentially stored in the frame memory 1.

In step S31, the selector 103 determines whether an operation signal corresponding to an operation performed by the user on the operation unit 102 has been supplied. If it is determined in step S31 that an operation signal has not been supplied, step S32 is skipped, and then, the process proceeds to step S33.

If it is determined in step S31 that an operation signal has been supplied, the process proceeds to step S32. In step S32, the selector 103 selects one of the tap coefficient memories 101A through 101C according to the operation signal supplied from the operation unit 102, and reads the tap coefficient stored in the selected tap coefficient memory. The selector 103 then supplies the tap coefficient to the coefficient RAM 5 and stores it therein by overwriting the previous tap coefficient by it.

Figure 3:
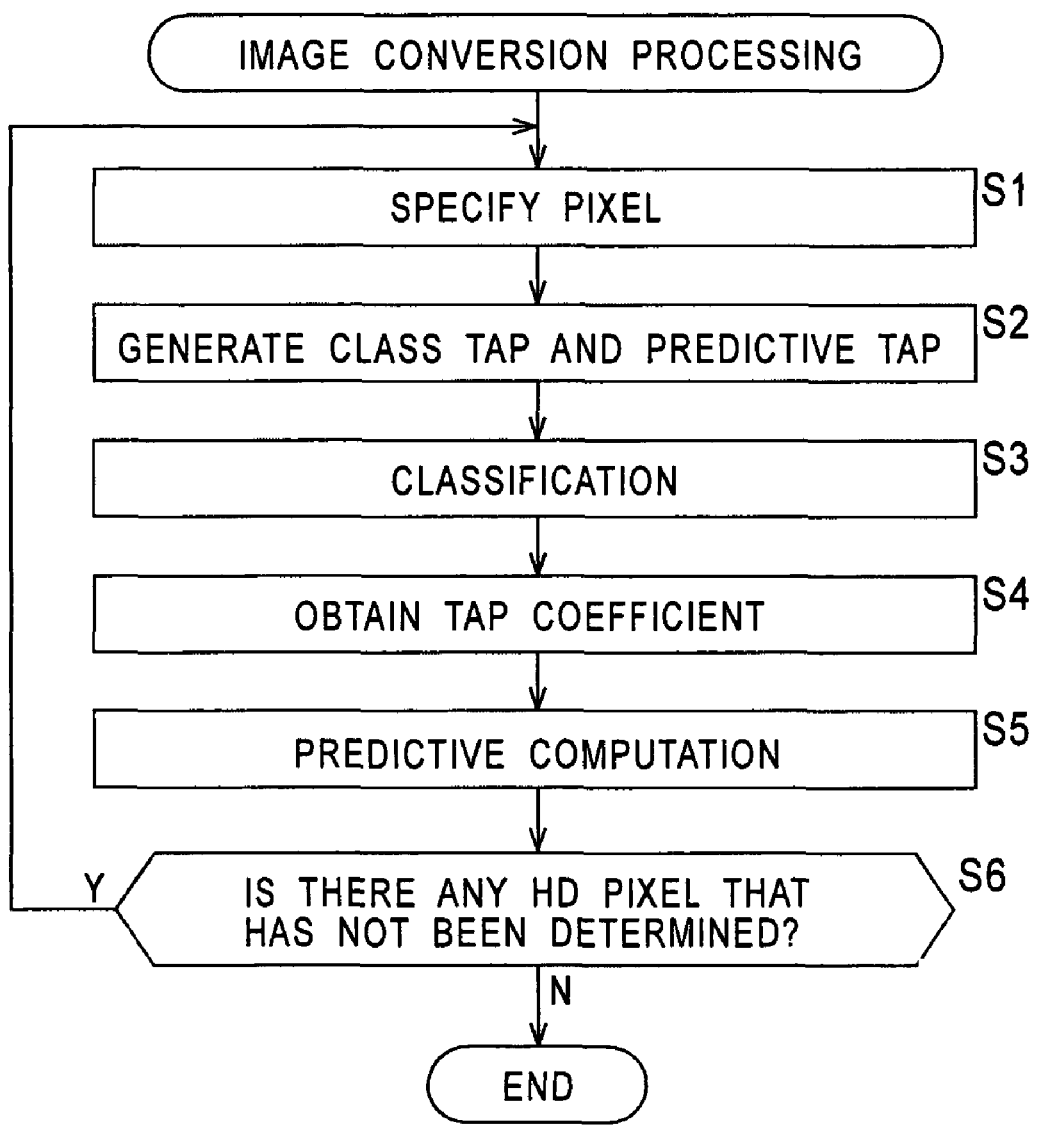
FIG. 3 is a flowchart illustrating processing performed by the image processing apparatus.

The process proceeds to step S33, and steps S33 through S38, which are similar to steps S1 through S6 in FIG. 3, are performed.

More specifically, in step S33, the class-tap generating circuit 2 selects an HD pixel which has not been determined as a specified pixel, and the process proceeds to step S34.

In step S34, the class-tap generating circuit 2 and the predictive-tap generating circuit 3 extract a plurality of SD pixels positioned spatially or temporally close to the specified pixel from the SD image stored in the frame memory 1 so as to a generate class tap and a predictive tap, respectively, thereby supplying them to the classification circuit 4 and the predictive-computation circuit 6, respectively.

The process then proceeds to step S35 in which the classification circuit 4 classifies the specified pixel based on the class tap supplied from the class-tap generating circuit 2, and outputs the class code representing the resulting class of the specified pixel to the coefficient RAM 5 as the address. The process then proceeds to step S36. In step S36, the coefficient RAM 5 reads the tap coefficient stored at the address corresponding to the class code supplied from the classification circuit 4 so as to obtain the tap coefficient for the class of the specified pixel, and supplies it to the predictive-computation circuit 6.

Subsequently, in step S37, the predictive-computation circuit 6 performs computation expressed by equation (1) by using the predictive tap supplied from the predictive-tap generating circuit 3 and the tap coefficient supplied from the coefficient RAM 5 so as to determine the predictive value of the HD pixel y, which is the specified pixel. Then, the process proceeds to step S38.

In step S38, the class-tap generating circuit 2 determines whether there is an HD pixel that has not been determined as the specified pixel. If it is determined that there is an unspecified HD pixel, the process returns to step S31, and processing similar to the above-described processing is repeated.

If it is determined in step S38 that there is no HD pixel that has not been determined as the specified pixel, the process is completed.

Accordingly, in the image processing apparatus shown in FIG. 8, SD image data can be converted into HD image data by using a tap coefficient corresponding to a predetermined weighting characteristic in accordance with the operation performed by the user on the operation unit 102. Thus, the user is able to obtain an image of a desired image quality by adjusting the level of the DR masking effect by operating the operation unit 102.

In the image processing apparatus shown in FIG. 8, tap coefficients corresponding to three types of weighting characteristics are prestored, and one tap coefficient for converting SD image data into HD image data is selected from the tap coefficients. In the image processing apparatus, however, tap coefficients corresponding to two types or four or more types of weighting characteristics may be stored.

In the above-described example, in the learning device shown in FIG. 4, the tap coefficients corresponding to the three types of weighting characteristics obtained by repeatedly performing learning while sequentially storing the three types of weighting characteristics in the weight control circuit 71 are stored in the tap coefficient memories 101A through 101C. However, the tap coefficients corresponding to the three types of weighting characteristics to be stored in the tap coefficient memories 101A through 101C can be determined by conducting learning at one time.

Figure 10:
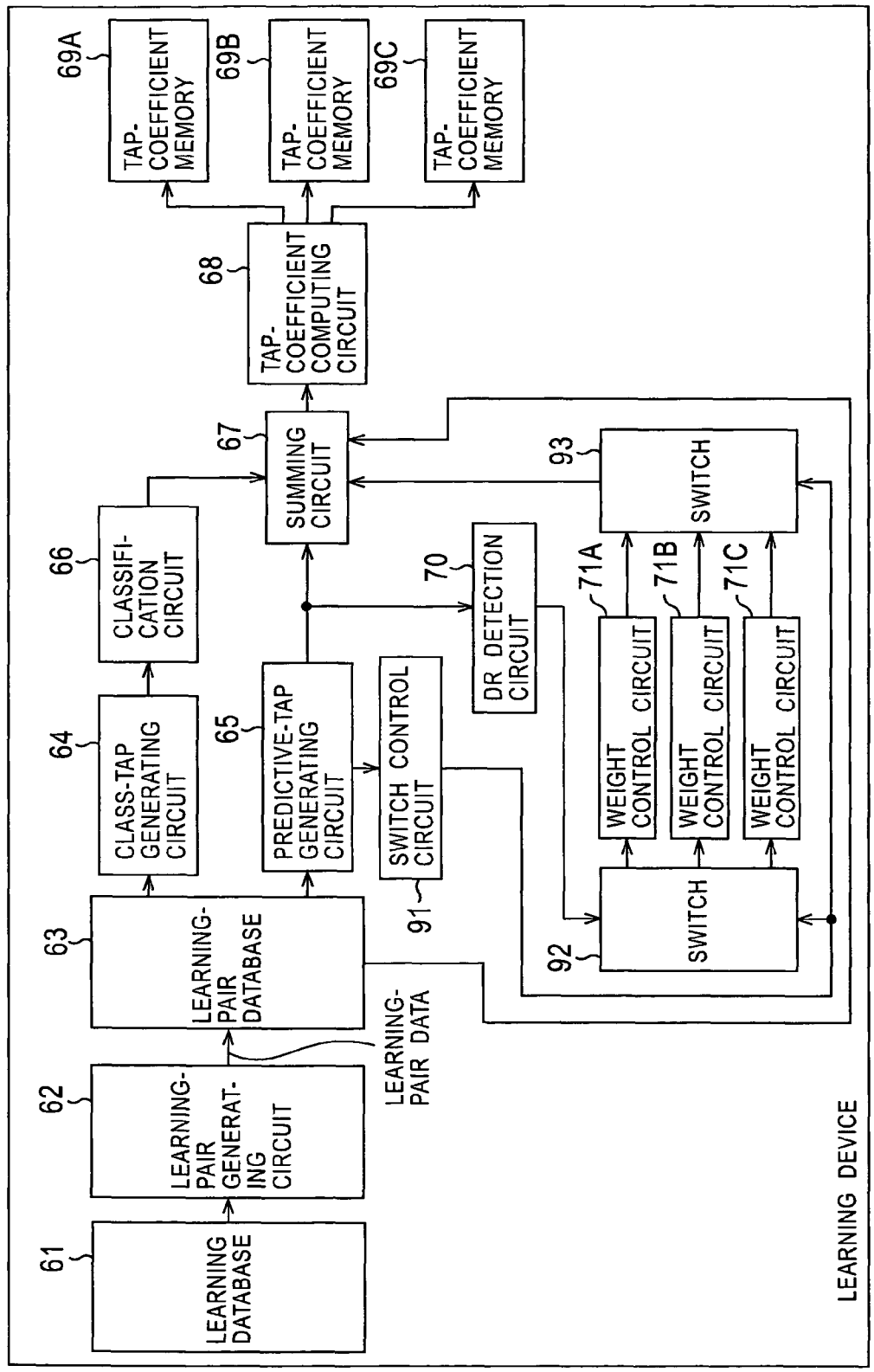
FIG. 10 is a block diagram illustrating an example of the configuration of a second embodiment of the learning device to which the present invention is applied.

FIG. 10 illustrates an example of the configuration of an embodiment of a learning device for determining tap coefficients corresponding to three types of weighting characteristics by conducting learning at one time. In FIG. 10, the elements corresponding to those in FIG. 4 are indicated by like reference numerals, and an explanation thereof is thus omitted. In the learning device in FIG. 10, new elements, i.e., a switch control circuit 91 and switches 92 and 93, are added to the learning device in FIG. 4. In the learning device in FIG. 10, instead of the single weight control circuit 71 in the learning device in FIG. 4, three weight control circuits 71A through 71C are provided, and instead of the single tap coefficient memory 69, three tap coefficient memories 69A through 69C are provided.

In the tap coefficient memories 69A through 69C, tap coefficients for the individual classes output from the tap-coefficient computing circuit 68 corresponding to three types of weighting characteristics, which are described below, are stored. The weight control circuits 71A through 71C store different weighing characteristics. Each of the weight control circuits 71A through 71C determines the weight corresponding to the dynamic range of the predictive tap supplied from the DR detection circuit 70 via the switch 92 according to the stored weighting characteristic, and supplies weighting information indicating the weight to the summing circuit 67 via the switch 93.

The switch control circuit 91 monitors the timing with which the predictive tap for the specified pixel is generated in the predictive-tap generating circuit 65, and controls the switches 92 and 93 based on the timing.

Under the control of the switch control circuit 91, the switch 92 selects one of the weight control circuits 71A through 71C, and supplies the dynamic range of the predictive tap output from the DR detection circuit 70 to the selected weight control circuit. Also under the control of the switch control circuit 91, the switch 93 selects one of the weight control circuits 71A through 71C, and supplies weighting information output from the selected weight control circuit to the summing circuit 76.

Figure 11:
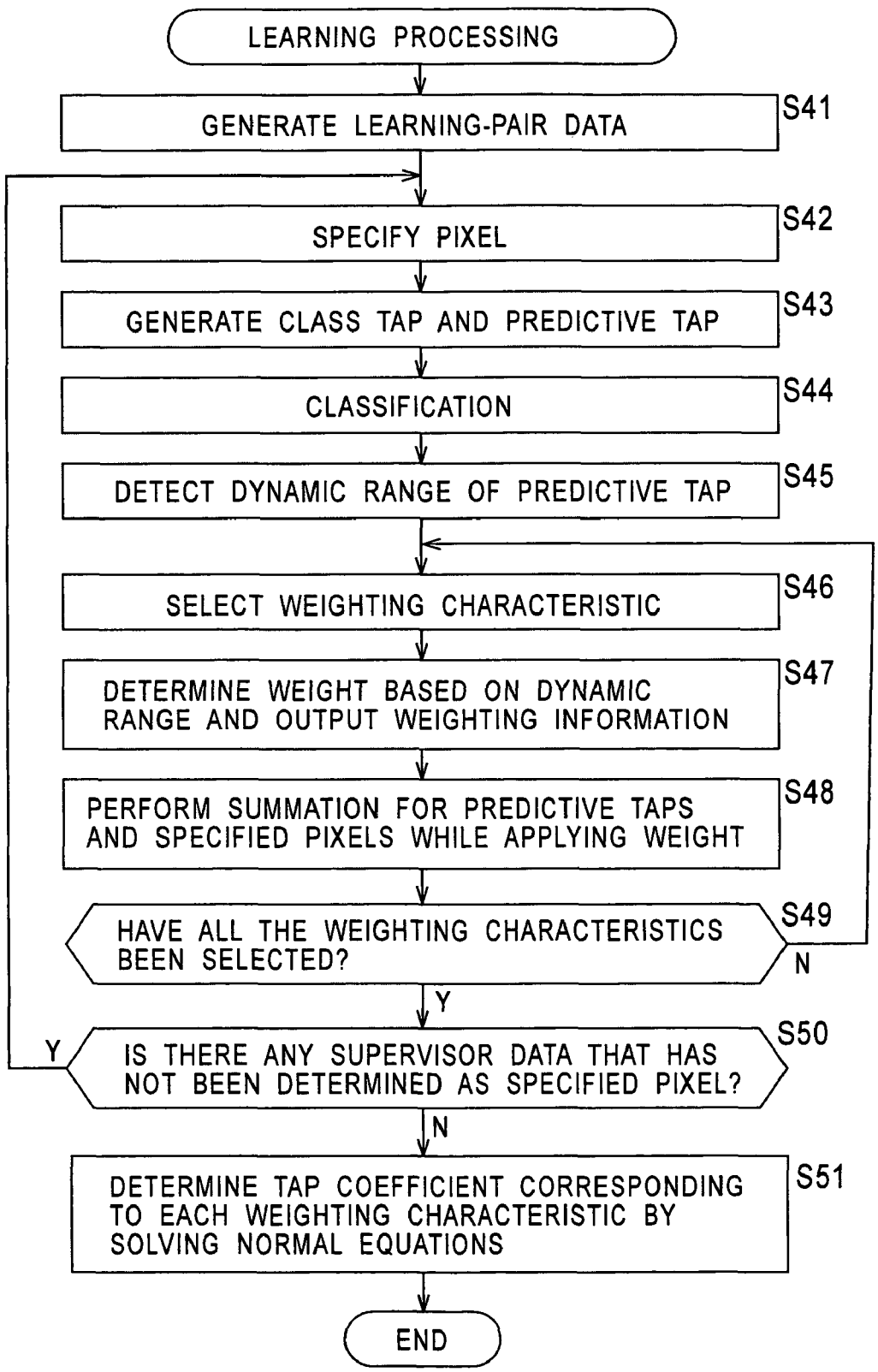
FIG. 11 is a flowchart illustrating processing performed by the learning device.

Learning processing for determining a tap coefficient for each class conducted in the learning device shown in FIG. 10 is described below with reference to the flowchart of FIG. 11.

Figure 7:
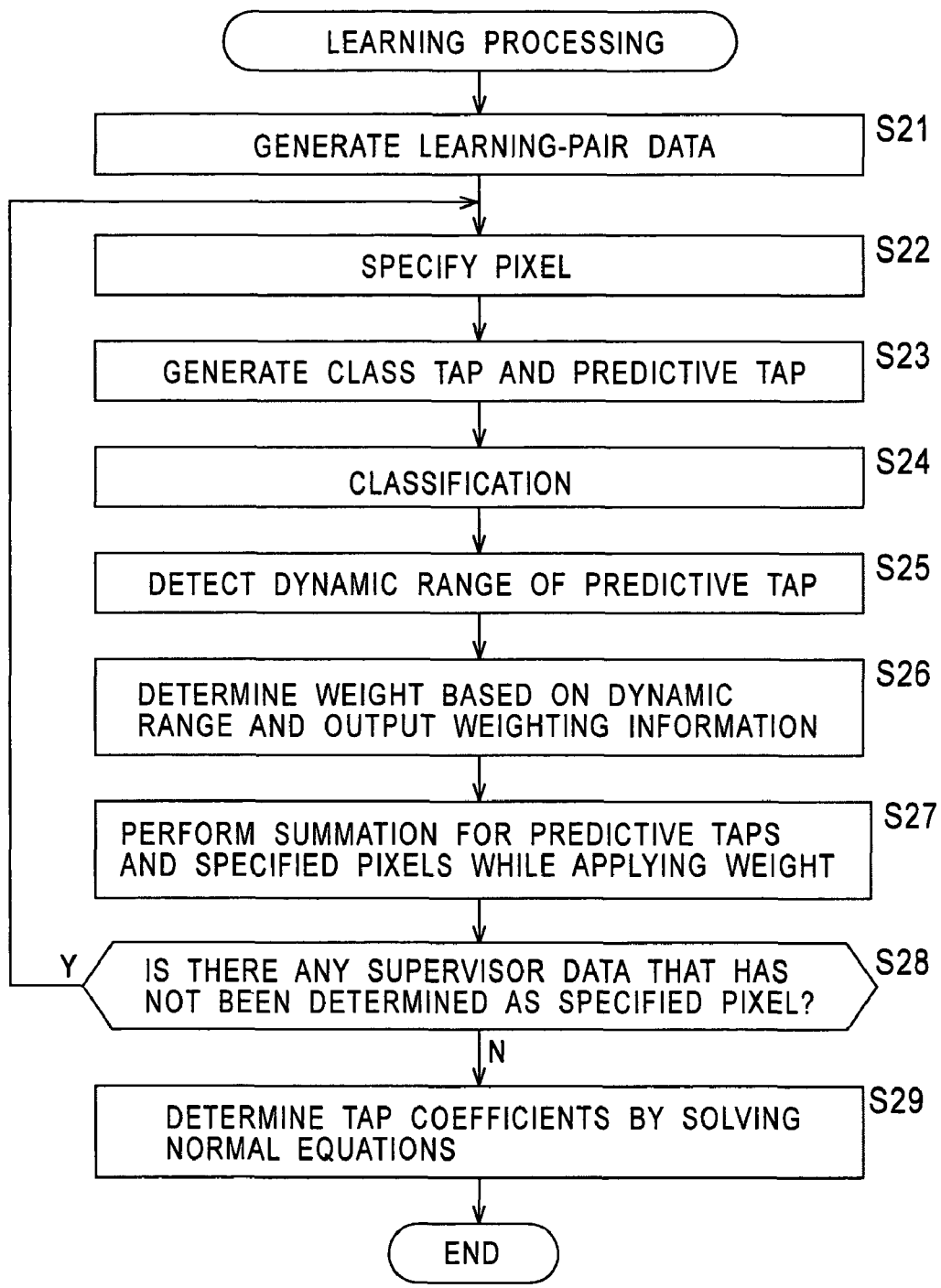
FIG. 7 is a flowchart illustrating processing performed by the learning device.

In steps S41 through S45, processings similar to those in steps S21 through S25, respectively, in FIG. 7 are performed.

More specifically, in step S41, the learning-pair generating circuit 62 reads learning image data from the learning database 61 so as to generate learning-pair data, which is a set of supervisor data and learner data, and supplies the learning-pair data to the learning-pair database 63 and stores it therein.

The process then proceeds to step S42. In step S42, the class-tap generating circuit 64 selects one of the HD pixels (which has not been determined as the specified pixel) forming the supervisor data of the learning-pair data stored in the learning-pair database 63, and the process then proceeds to step S43. In step S43, the class-tap generating circuit 64 and the predictive-tap generating circuit 65 generate a class tap and a predictive tap, respectively, for the specified pixel from the SD pixels forming the learner data stored in the learning-pair database 63. The class tap is supplied from the class-tap generating circuit 64 to the classification circuit 66, and the predictive tap is supplied from the predictive-tap generating circuit 65 to the summing circuit 67 and the DR detection circuit 70.

The process then proceeds to step S44 in which the classification circuit 66 classifies the specified pixel by using the class tap supplied from the class-tap generating circuit 64, and supplies the class code indicating the resulting class of the specified pixel to the summing circuit 67. The process then proceeds to step S45.

In step S45, the DR detection circuit 70 detects the dynamic range of the predictive tap supplied from the predictive-tap generating circuit 65, and outputs the detected dynamic range. The dynamic range of the predictive tap output from the DR detection circuit 70 is supplied to the switch 92.

The process then proceeds to step S46. In step S46, the switch control circuit 91 selects one of the three types of weighting characteristics which are stored in the weight control circuits 71A through 71C in synchronization with generating the predictive taps in the predictive-tap generating circuit 3 in step S43, the selected weighting characteristic being referred to as the specified weighting characteristic. Also in step S46, the switch control circuit 91 controls the switches 92 and 93 to select the weight control circuit (hereinafter sometimes referred to as the "specified weight control circuit") which stores the specified weighting characteristic therein from the weight control circuits 71A through 71C. The process then proceeds to step S47.

Then, according to the processing of step S46, the DR detection circuit 70 and the specified weight control circuit are connected to each other via the switch 92, and the specified weight control circuit and the summing circuit 67 are connected to each other via the switch 93.

In step S47, the specified weight control circuit receives the dynamic range of the predictive tap output from the DR detection circuit 70 via the switch 92, and determines the weight for the specified pixel and the predictive tap based on the dynamic range according to the specified weighting characteristic stored in the specified weight control circuit. In step S47, the specified weight control circuit also supplies weighting information indicating the determined weight to the summing circuit 67 via the switch 93.

The process then proceeds to step S48. In step S48, the summing circuit 67 performs summation in equations (20) for the predictive tap supplied from the predictive-tap generating circuit 65, the supervisor data as the specified pixel stored in the learning-pair database 63, and the weight represented by the weighting information supplied from the specified weight control circuit via the switch 93 according to each class of the specified pixel represented by the class code supplied from the classification circuit 66. The process then proceeds to step S49.

In step S48, the summing circuit 67 performs summation in equations (20) according to the weighting characteristic stored in each of the weight control circuits 71A through 71C. In the embodiment shown in FIG. 10, therefore, normal equations expressed by equations (20) are independently established for each of the three weighting characteristics for at least one class in the summing circuit 67.

In step S49, the switch control circuit 91 determines whether all the three types of weighting characteristics stored in the weight control circuits 71A through 71C have been determined for the specified pixel.

If it is determined in step S49 that all the three types of weighting characteristics have not been determined for the specified pixel, the process returns to step S46, and processing similar to the above-described processing is repeated.

In this case, in step S46, one of the unspecified weighting characteristics is selected for the specified pixel, and the processing similar to the above-described processing is then repeated.

If it is determined in step S49 that all the three types of weighting characteristics have been specified for the specified pixel, the process proceeds to step S50. In step S50, the class-tap generating circuit 64 determines whether there is any pixel in the supervisor data stored in the learning-pair database 63 that has not been determined as the specified pixel. If it is determined in step S50 that there is an undetermined pixel in the supervisor data stored in the learning-pair database 63, the process returns to step S42, and processing similar to the above-described processing is repeated.

If it is determined in step S50 that there is no pixel in the supervisor data stored in the learning-pair database 63 that has not been determined as the specified pixel, the summing circuit 67 supplies the normal equations expressed by equations (20) obtained for each class and for each type of weighting characteristics obtained by summation in step S48 to the tap-coefficient computing circuit 68. The process then proceeds to step S51.

In step S51, the tap-coefficient computing circuit 68 solves the normal equations expressed by equations (20) for each class and for each of the three types of weighting characteristics supplied from the summing circuit 67, thereby determining a tap coefficient for each class and for each of the three types of weighting characteristics. The tap-coefficient computing circuit 68 then supplies the determined tap coefficients to the tap coefficient memories 69A through 69C and stores them therein. The process is then completed.

In the image processing apparatus shown in FIG. 8, as stated above, the user is able to obtain HD image data converted from SD image data by using the tap coefficient of a desired one of the three types of weighting characteristics by operating the operation unit 102. Accordingly, the user is able to select his/her favorite image quality from the three types of HD image data.

However, there may be a case in which there is no image quality desired by the user among the three types of HD image data.

Accordingly, there is a method in which tap coefficients corresponding to more types of weighting characteristics are stored in the image processing apparatus shown in FIG. 8 so as to select the tap coefficient for converting SD image data into HD image data.

However, if the tap coefficients corresponding to more types of weighting characteristics are stored in the image processing apparatus shown in FIG. 8, a greater number of memories are required for storing such tap coefficients, thereby increasing the size of the apparatus.

Additionally, even if the tap coefficients corresponding to more types of weighting characteristics are stored in the image processing apparatus shown in FIG. 8, it is impossible to obtain HD image data by using tap coefficients corresponding to weighting characteristics that are not stored in the image processing apparatus shown in FIG. 8.

Figure 12:
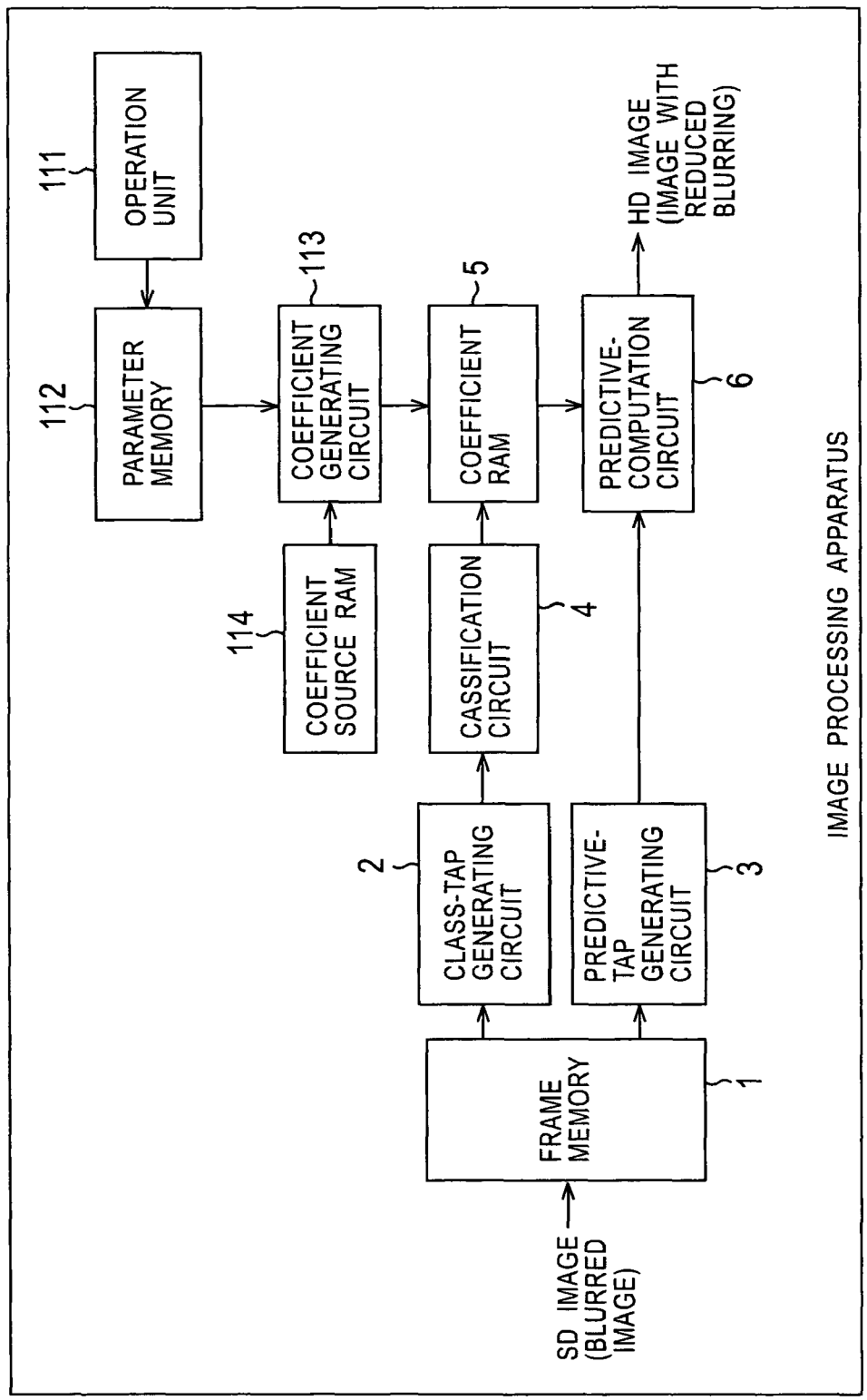
FIG. 12 is a block diagram illustrating an example of the configuration of a third embodiment of the image processing apparatus to which the present invention is applied.

FIG. 12 illustrates an example of the configuration of an embodiment of an image processing apparatus for generating a tap coefficient corresponding to a desired weighting characteristic so as to convert SD image data into HD image data having a quality desired by the user by using such a tap coefficient. In FIG. 12, the same elements as those shown in FIG. 2 are indicated by like reference numerals, and an explanation thereof is thus omitted. The configuration of the image processing apparatus shown in FIG. 12 is similar to that shown in FIG. 2, except that new elements, i.e., an operation unit 111, a parameter memory 112, a coefficient generating circuit 113, and a coefficient source RAM 114, are provided.

The operation unit 111 is operated by the user to input a parameter z representing a weighting characteristic, and supplies the parameter z to the parameter memory 112.

The parameter memory 112 stores the parameter z supplied from the operation unit 111 therein by overwriting the previous parameter by it.

Based on the parameter z stored in the parameter memory 112, the coefficient generating circuit 113 generates a tap coefficient for each class corresponding to the weighting characteristic represented by the parameter z by using coefficient source data for the corresponding class stored in the coefficient source RAM 114. The coefficient generating circuit 113 then supplies the generated tap coefficient to the coefficient RAM 5 and stores it therein by overwriting the previous tap coefficient by it.

The coefficient source RAM 114 stores the coefficient source data for each class, which serves as the source for generating the tap coefficient for each class, the coefficient source data being determined by a learning device shown in FIG. 14, which is described below.

Image conversion processing performed by the image processing apparatus shown in FIG. 12 is described below with reference to the flowchart of FIG. 13.

In the image processing apparatus, as in the image processing apparatus shown in FIG. 2, an SD image (moving picture) to be subjected to image conversion processing is supplied to the frame memory 1 sequentially in units of frames. The frames of the SD image supplied are sequentially stored in the frame memory 1.

In step S61, the parameter memory 112 determines whether a new parameter z has been supplied from the operation unit 111 upon operating the operation unit 111.

If it is determined in step S61 that the new parameter z has been supplied from the operation unit 111 to the parameter memory 112, the process proceeds to step S62. In step S62, the parameter memory 112 stores the new parameter z therein by overwriting the previous parameter by it. The process then proceeds to step S63.

If it is determined in step S61 that the new parameter z has not been supplied from the operation unit 111 to the parameter memory 112, step S62 is skipped, and the process proceeds to step S63.

Accordingly, if the user operates the operation unit 111 to input the new parameter z, the storage content of the parameter memory 112 is updated by the new parameter z.

In step S63, the coefficient generating circuit 113 reads coefficient source data for each class from the coefficient source RAM 114, and also reads the parameter z from the parameter memory 112 so as to determine the tap coefficient for each class corresponding to the weighting characteristic represented by the parameter z from the coefficient source data. The process then proceeds to step S64. In step 64, the coefficient generating circuit 113 supplies the tap coefficient for each class to the coefficient RAM 5, and stores it therein by overwriting the previous tap coefficient by it.

The process then sequentially proceeds from steps S65 to S70, and processings similar to those in steps S1 through S6 in FIG. 3 are executed.

More specifically, in step S65, the class-tap generating circuit 2 selects one HD pixel which has not been determined as the specified pixel, and the process proceeds to step S66. In step S66, the class-tap generating circuit 2 and the predictive-tap generating circuit 3 generate a class tap and a predictive tap, respectively, for the specified pixel, and supply the class tap and the predictive tap to the classification circuit 4 and the predictive-computation circuit 7, respectively.

The process then proceeds to step S67. In step S67, the classification circuit 4 classifies the specified pixel based on the class tap supplied from the class-tap generating circuit 2, and supplies the class code representing the resulting class of the specified pixel to the coefficient RAM 5. The process then proceeds to step S68. In step S68, the coefficient RAM 5 reads the tap coefficient stored at the address corresponding to the class code supplied from the classification circuit 4 so as to obtain the tap coefficient for the class of the specified pixel, and supplies it to the predictive-computation circuit 6.

As stated above, in the coefficient RAM 5, the tap coefficient corresponding to the weighting characteristic represented by the parameter z stored in the parameter memory 112 and generated in the coefficient generating circuit 113 is stored. Accordingly, such a tap coefficient is supplied to the predictive-computation circuit 6.

Then, the process proceeds to step S69. In step S69, the predictive-computation circuit 6 computes equation (1) by using the predictive tap supplied from the predictive-tap generating circuit 3 and the tap coefficient supplied from the coefficient RAM 5 so as to determine the predictive value of the HD pixel y, which is the specified pixel. The process then proceeds to step S70.

As in the image processing apparatus in FIG. 2, the predictive-computation circuit 6 stores the HD pixel obtained in step S68 until HD pixels for one frame are determined, and when HD pixels for one frame are determined, an HD image for one frame consisting of those HD pixels is output.

In step S70, the class-tap generating circuit 2 determines whether there is any HD pixel which has not been determined as the specified pixel. If it is determined that there is an unspecified HD pixel, the process returns to step S61, and processing similar to the above-described processing is repeated.

If it is determined in step S70 that there is no HD pixel which has not been determined as the specified pixel, the process is completed.

As described above, since the parameter z representing the weighting characteristic can be input by operating the operation unit 111 by the user, the user is able to change the weighting characteristic so as to obtain an HD image of a desired quality.

Figure 13:
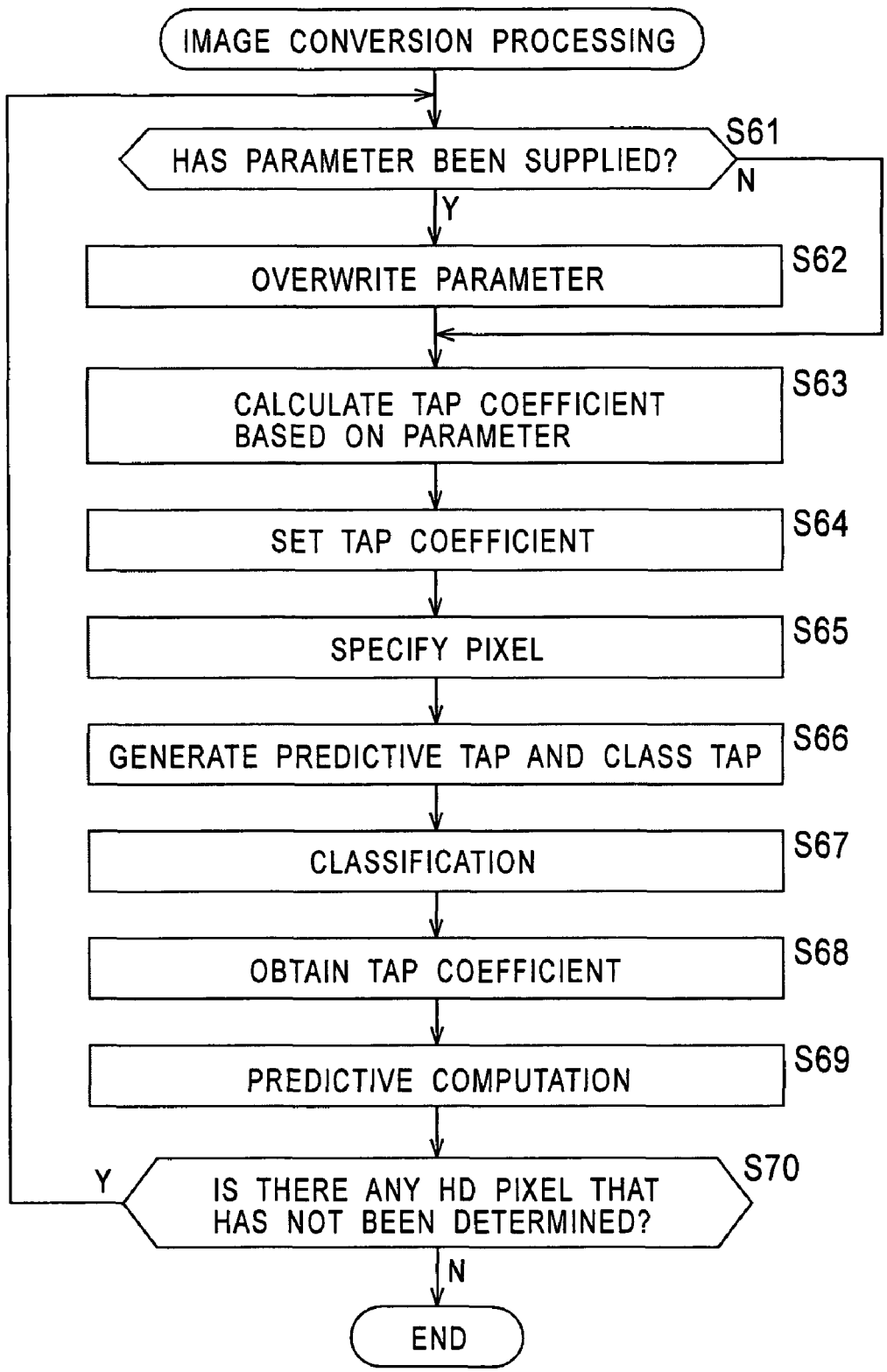
FIG. 13 is a flowchart illustrating processing performed by the image processing apparatus.

In FIG. 13, steps S63 and S64 may be performed only when a new parameter z overwrites the previous parameter in the parameter memory 112, and in other cases, they may be omitted.

A description is now given of generation processing for tap coefficients by the coefficient generating circuit 113 shown in FIG. 12 and of learning processing for coefficient source data to be stored in the coefficient source RAM 114.

In the embodiment shown in FIG. 12, in the coefficient generating circuit 113, the tap coefficient $w_n$ used in computing equation (1) is generated from the coefficient source data stored in the coefficient source RAM 114 and the parameter z stored in the parameter memory 112. It is now assumed that the tap coefficient $w_n$ in the coefficient generating circuit 113 is generated by, for example, the following equation using the coefficient source data and the parameter.

$$w_n = \sum_{m=1}^{M} \beta_{m,n} z^{m-1} \tag{21}$$

In equation (21), $\beta_{m,n}$ indicates the m-th coefficient source data used for determining the n-th tap coefficient $w_n$, and z designates a parameter. In equation (21), the tap coefficient $w_n$ is determined by using M items of coefficient source data $\beta_{n,1}, \beta_{n,2}, \ldots \beta_{n,M}$.

The equation for determining the tap coefficient $w_n$ is not restricted to equation (21).

The value $z^{m-1}$, which is determined by the parameter z in equation (21), is now defined by the following equation by introducing a new variable $t_m$.

$$t_m = z^{m-1} (m=1,2,\ldots,M) \tag{22}$$

By substituting equation (22) into equation (21), the following equation is obtained.

$$w_n = \sum_{m=1}^{M} \beta_{m,n} t_m \tag{23}$$

According to equation (23), the tap coefficient $w_n$ can be determined by a linear equation of coefficient source data $\beta_{n,m}$ and the variable $t_m$. When the tap coefficient determined by equation (23) is represented by $w_n{'}$, the coefficient source data $\beta_{n,m}$ that sets the error $e_n$, which is expressed by equation (24), between the tap coefficient $w_n$ that minimizes the sum of the square errors in equation (4) (hereinafter sometimes referred to as the "optimal tap coefficient") and the tap coefficient $w_n$, determined by equation (23) to be 0 is the optimal value for determining the optimal tap coefficient $w_n$.

$$e_n = w_n - w_n{'} \tag{24}$$

Generally, however, it is very difficult to determine the coefficient source data $\beta_{n,m}$ that sets the error $e_n$ in equation (24) to be 0 for all the tap coefficients $w_n$.

As the standard for indicating that the coefficient source data $\beta_{n,m}$ is optimal, the method of least squares, for example, is employed. Then, equation (24) can be modified into the following equation according to equation (23).

$$e_n = w_n - \left( \sum_{m=1}^{M} \beta_{m,n} t_m \right) \tag{25}$$

Then, according to the method of least squares, the optimal coefficient source data $\beta_{n,m}$ can be determined by minimizing the sum E, expressed by the following equation, of the square errors of the errors $e_n$ in equation (25).

$$E = \sum_{n=1}^{N} e_n^2 \tag{26}$$

The minimum (relative minimum) value of the sum E of the square errors in equation (26) can be given by the coefficient source data $\beta_{n,m}$ that satisfies the condition that the value determined by partial-differentiating the sum E with the coefficient source data $\beta_{n,m}$ becomes 0, as expressed by equation (27).

$$\frac{\partial E}{\partial \beta_{m,n}} = \sum_{m=1}^{M} 2 \frac{\partial e_n}{\partial \beta_{m,n}} \cdot e_n = 0 \tag{27}$$

By substituting equation (25) into equation (27), the following equation can be obtained.

$$\sum_{m=1}^{M} t_m \left( w_n - \left( \sum_{m=1}^{M} \beta_{m,n} t_m \right) \right) = 0 \tag{28}$$

It is now assumed that $X_{i,j}$ and $Y_i$ are defined as expressed by equations (29) and (30), respectively.

$$X_{i,j} = \sum_{z=0}^{Z} t_i t_j \quad (i=1, 2, \cdots, M : j = 1, 2, \cdots, M) \tag{29}$$

$$Y_i = \sum_{z=0}^{Z} t_i w_n \tag{30}$$

In this case, equation (28) can be expressed by normal equations in equations (31) using $X_{i,j}$ and $Y_i$.

$$\begin{bmatrix} X_{1,1} & X_{1,2} & \cdots & X_{1,M} \\ X_{2,1} & X_{2,1} & \cdots & X_{2,2} \\ \vdots & \vdots & \ddots & \vdots \\ X_{M,1} & X_{M,2} & \cdots & X_{M,M} \end{bmatrix} \begin{bmatrix} \beta_{1,n} \\ \beta_{2,n} \\ \vdots \\ \beta_{M,n} \end{bmatrix} = \begin{bmatrix} Y_1 \\ Y_2 \\ \vdots \\ Y_M \end{bmatrix} \tag{31}$$

The normal equations in equations (31) can be solved for the coefficient source data $\beta_{n,m}$ by, for example, the sweep-out method (Gauss-Jordan elimination).

Figure 14:
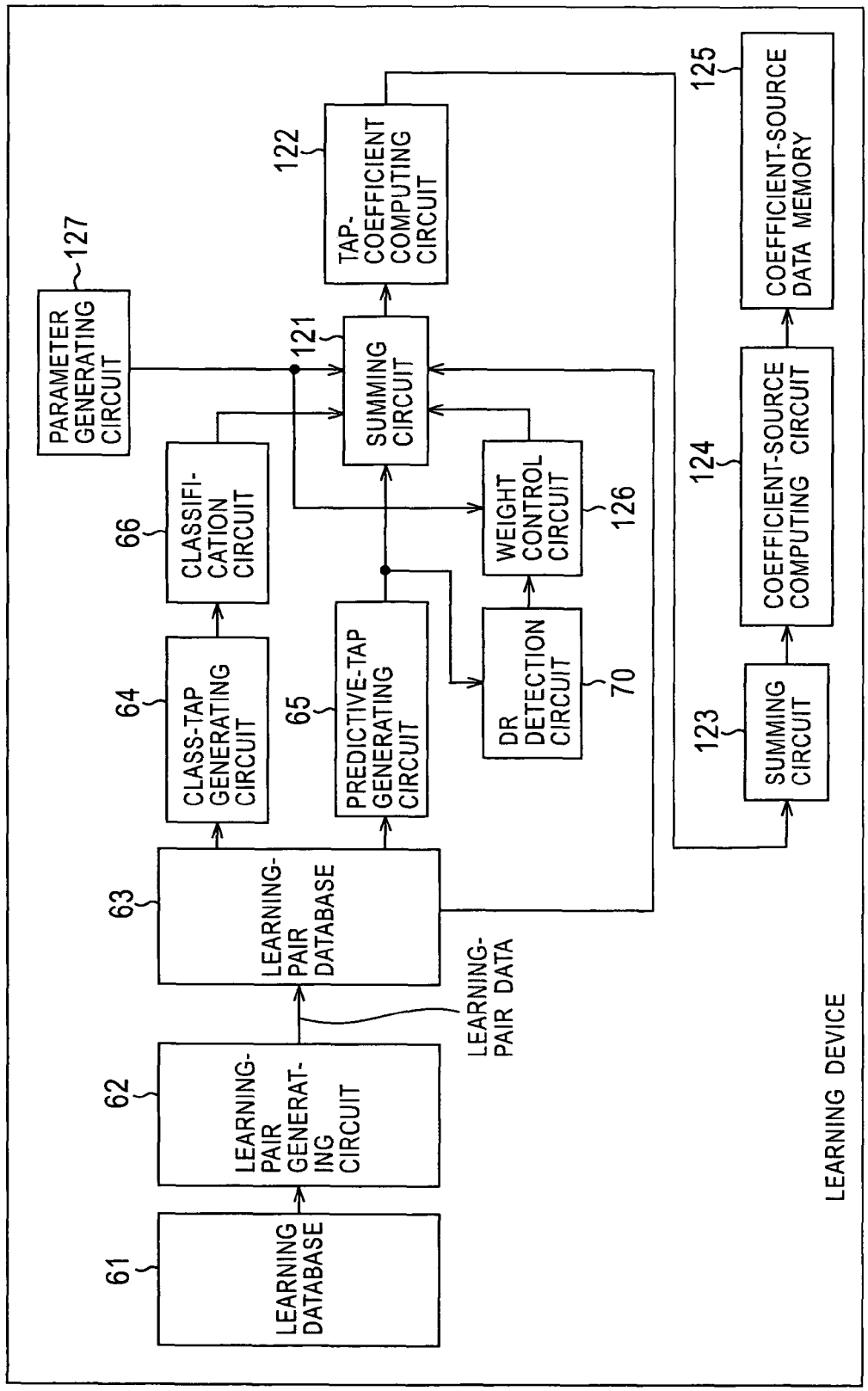
FIG. 14 is a block diagram illustrating an example of the configuration of a third embodiment of the learning device to which the present invention is applied.

FIG. 14 illustrates an example of the configuration of a learning device for conducting learning for determining the coefficient source data $\beta_{n,m}$ by solving the normal equations in equations (31). In FIG. 14, elements corresponding to those in FIG. 4 are designated with like reference numerals, and an explanation thereof is thus omitted. The configuration of the learning device shown in FIG. 14 is similar to that of FIG. 4, except for the following points. Instead of the summing circuit 68, the tap-coefficient computing circuit 68, and the tap coefficient memory 69, a summing circuit 121, a tap-coefficient computing circuit 122, a summing circuit 123, a coefficient-source computing circuit 124, and a coefficient-source data memory 125 are provided. The weight control circuit 71 is substituted by a weight control circuit 126, and a parameter generating circuit 127 is newly disposed.

The summing circuit 121, the tap-coefficient computing circuit 122, the summing circuit 123, and the coefficient-source computing circuit 124 learn the relationship between supervisor data, which is the specified pixel, and learner data, forming the learning-pair data stored in the learning-pair database 63 for each class supplied from the classification circuit 66 while applying weighting to the supervisor data and the predictive tap supplied from the predictive-tap generating circuit 65 under the control of the weight control circuit 126, thereby determining the coefficient source data for each class.

More specifically, the supervisor data, which is the specified pixel, stored in the learning-pair database 63, the predictive tap for the specified pixel output from the predictive-tap generating circuit 65, the class code for the specified pixel output from the classification circuit 66, the weighting information output from the weight control circuit 126, and the parameter z output from the parameter generating circuit 127 are supplied to the summing circuit 121.

As in the summing circuit 67 in FIG. 4, the summing circuit 121 performs summation for the specified pixel $y_k$, the SD pixel $x_{n,k}$ forming the predictive tap, and the weight $h_k$ represented by the weighting information, thereby determining each component in the matrix at the left side and each component forming the vector at the right side of equations (20). The summing circuit 67 shown in FIG. 4 performs summation in equations (20) for each class. In contrast, the summing circuit 121 performs summation in equations (20) for each class and for each value of the parameter z.

That is, the summing circuit 121 performs computation corresponding to multiplication ($x_{n,k}x_{n,k}h_k$) of a plurality of items of the learner data and summation ($\Sigma$) in the matrix at the left side of equations (20) by using the predictive tap $x_{n,k}$ for each class corresponding to the class code supplied from the classification circuit 66 and for each value of the parameter z output from the parameter generating circuit 127.

The summing circuit 121 also performs computation corresponding to multiplication ($x_{n,k}y_kh_k$) of the learner data $x_{n,k}$ and the supervisor data $y_k$ and summation ($\Sigma$) in the vector at the right side of equations (20) by using the predictive tap $x_{n,k}$ and the supervisor data $y_k$ for each class corresponding to the class code supplied from the classification circuit 66 and for each value of the parameter z output from the parameter generating circuit 127.

More specifically, the summing circuit 121 stores the component ($\Sigma x_{n,k}x_{n,k}h_k$) in the matrix at the left side and the component ($\Sigma x_{n,k}x_{n,k}y_kh_k$) in the vector at the right side in equations (20) determined for the supervisor data, which is the previous specified pixel, in built-in memories (corresponding to the memories 83 and 84 forming the summing circuit 67 shown in FIG. 5). Then, by using the supervisor data, which is the current specified pixel, the summing circuit 121 adds (addition represented by the summation in equations (20)) the corresponding component $x_{n,k+1}x_{n,k+1}h_{k+1}$ or $x_{n,k+1}y_{k+1}h_{k+1}$ calculated for the supervisor data, which is the current-specified pixel, by using the specified pixel $y_{k+1}$, the predictive tap $x_{n,k+1}$, and the weight $h_{k+1}$ to the component ($\Sigma x_{n,k}x_{n'k}h_k$) in the matrix or the component ($\Sigma x_{n,k}y_kh_k$) in the vector, respectively.

The summing circuit 121 then performs the above-described summation for all the items of the supervisor data stored in the learning-pair database 63 by determining them as the specified pixel so as to establish the normal equations expressed by equations (20) for each value of the parameter z and for each class, and supplies the normal equations to the tap-coefficient computing circuit 122.

The tap-coefficient computing circuit 122 solves the normal equations for each value of the parameter z and for each class supplied from the summing circuit 121 so as to determine the optimal tap coefficient $w_n$ for each value of the parameter z and for each class, and supplies the optimal tap coefficient $w_n$ to the summing circuit 123.

The summing circuit 123 performs summation for the parameter z (corresponding variable $t_m$) and the optimal tap coefficient $w_n$ for each class.

More specifically, by using the variable $t_i(t_j)$ determined from the parameter z by equation (22), the summing circuit 123 performs computation, for each class, of the multiplication ($t_i t_j$) of the variables $t_i(t_j)$ corresponding to the parameter z and the summation (X) so as to determine the component $X_{i,j}$ defined in equation (29) in the matrix at the left side in equations (31).

The component $X_{i,j}$ is determined only by the parameter z, and is not influenced by the class of the specified pixel. Accordingly, in reality, the component $X_{i,j}$ can be calculated only once without the need to be calculated for each class.

By using the variable $t_i$ determined from the parameter z by equation (22) and the optimal tap coefficient $w_n$, the summing circuit 123 performs computation, for each class, of the multiplication ($t_i w_n$) of the variable $t_i$ and the tap coefficient $w_n$ corresponding to the parameter z and the summation ($\Sigma$) so as to determine the component $Y_i$ defined in equation (30) in the vector at the right side in equations (31).

The summing circuit 123 determines the component $X_{i,j}$ expressed by equation (29) and the component $Y_i$ expressed by equation (30) for each class so as to establish normal equations expressed by equations (31), and supplies the normal equations to the coefficient-source computing circuit 124.

The coefficient-source computing circuit 124 solves the normal equations expressed by equations (31) for each class supplied from the summing circuit 123 so as to determine the coefficient source data $\beta_{m,n}$ for each class, and outputs it.

The coefficient-source data memory 125 stores the coefficient source data $\beta_{m,n}$ for each class output from the coefficient-source computing circuit 124.

As in the weight control circuit 71 shown in FIG. 4, the weight control circuit 126 controls weighting to be performed in the above-described summing circuit 121 for the specified pixel and the predictive tap based on the dynamic range, which serves as the activity of the predictive tap, supplied from the DR detection circuit 70.

It should be noted, however, that the parameter z output from the parameter generating circuit 127 is supplied to the weight control circuit 126. The weight control circuit 126 stores a plurality of weighting characteristics in association with various values of the parameter z output from the parameter generating circuit 127. The weight control circuit 126 determines the weight h corresponding to the dynamic range of the predictive tap supplied from the DR detection circuit 70 in accordance with the weighting characteristic associated with the parameter z output from the parameter generating circuit 127. The weight control circuit 126 then supplies weighting information indicating an instruction to perform weighting for the specified pixel and the predictive tap by using the weight h to the summing circuit 121.

As the plurality of types of weighting characteristics stored in the weight control circuit 126, a two-value stepwise function, such as that shown in FIG. 6A, 6B, or 6C, in which one of or both the two values becomes increased or decreased in accordance with the value of the parameter z, can be used. As the plurality of types of weighting characteristics, a stepwise function, such as that shown in FIG. 6A, 6B, or 6C, in which the threshold of the dynamic range at which the weights applied to the two values are changed is varied according to the value of the parameter z, can be used. As the plurality of types of weighting characteristics, a function in which the weight gently changes according to the dynamic range, and the configuration of the function (a change in the weight) changes according to the value of the parameter z, such as that shown in FIG. 6A, 6B, or 6C, can be used.

The parameter generating circuit 127 generates a certain number of values, for example, z=0, 1, ..., Z, that can be taken as the parameter z to be supplied to the parameter memory 112 from the operation unit 111 shown in FIG. 12, and supplies the generated values to the summing circuit 121 and the weight control circuit 126.

As the parameter Z output from the parameter generating circuit 127, integers, such as 0, 1, ..., Z, can be employed. On the other hand, in the coefficient generating circuit 113 shown in FIG. 12, since the tap coefficient is calculated by using the coefficient source data $\beta_{m,n}$ and the parameter Z, as expressed by equation (21), real numbers including decimal points can be used as the parameter Z output from the operation unit 111 in FIG. 12.

Figure 15:
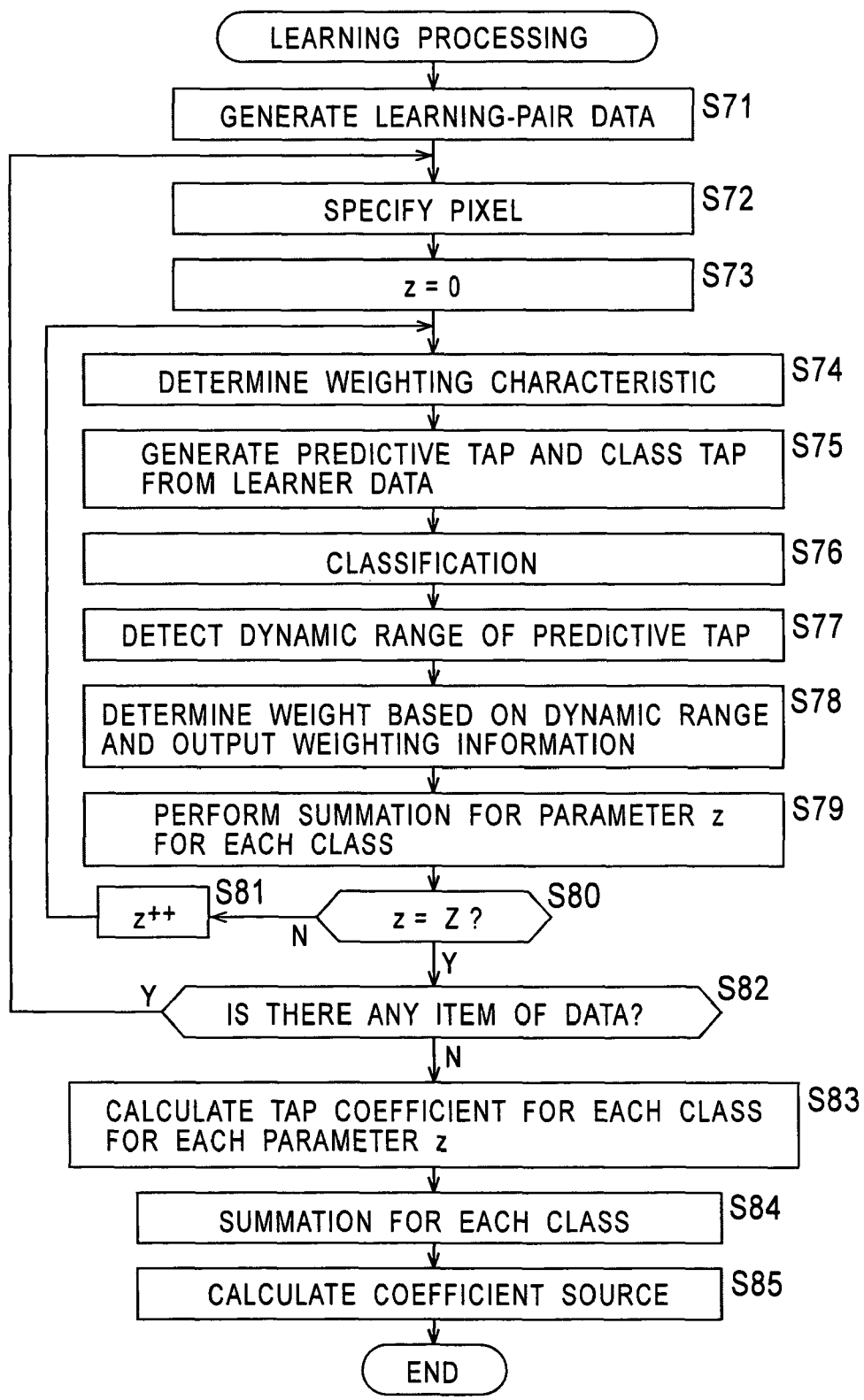
FIG. 15 is a flowchart illustrating processing performed by the learning device.

Processing (learning processing) performed by the learning device shown in FIG. 14 is described below with reference to the flowchart of FIG. 15.

In step S71, as in step S21 of FIG. 7, the learning-pair generating circuit 62 generates learning-pair data as a set of supervisor data and learner data from learning image data stored in the learning database 61, and supplies the learning-pair data to the learning-pair database 63 and stores it therein.

The process then proceeds to step S72. In step S72, the class-tap generating circuit 64 selects one HD pixel, which has not been determined as the specified pixel, as the supervisor data of the learning-pair data stored in the learning-pair database 63. The process then proceeds to step S73.

In step S73, the parameter generating circuit 127 sets the parameter z to the initial value, for example, 0, and supplies the parameter z to the summing circuit 121 and the weight control circuit 126. The process then proceeds to step S74.

In step S74, the weight control circuit 126 determines the weighting characteristic to be used for controlling weighting to be performed in the summing circuit 121. More specifically, in step S74, the weight control circuit 126 selects the weighting characteristic associated with the parameter z supplied from the parameter generating circuit 127 from the plurality of types of weighting characteristics stored in the weight control circuit 126, and determines the selected weighting characteristic to be used for controlling weighting to be performed in the summing circuit 121.

The process then proceeds to step S75. In step S75, the class-tap generating circuit 64 and the predictive-tap generating circuit 65 generate a class tap and a predictive tap, respectively, for the specified pixel from the SD pixels as the learner data stored in the learning-pair database 63. In step S75, the class-tap generating circuit 64 also supplies the class tap to the classification circuit 66, and the predictive-tap generating circuit 65 supplies the predictive tap to the DR detection circuit 70 and the summing circuit 121. The process then proceeds to step S76.

In step S76, the classification circuit 66 classifies the specified pixel by using the class tap supplied from the class-tap generating circuit 64, and supplies the class code indicating the class of the specified pixel to the summing circuit 121. The process then proceeds to step S77.

In step S77, the DR detection circuit 70 detects the dynamic range of the predictive tap from the predictive-tap generating circuit 65, and supplies the detected dynamic range to the weight control circuit 126. The process then proceeds to step S78. In step S78, the weight control circuit 126 determines the weight for the specified pixel and the predictive tap associated with the dynamic range supplied from the DR detection circuit 70 in accordance with the selected weighting characteristic determined in the previous step, i.e., step S74. The weight control circuit 126 then supplies weighting information indicating the determined weight to the summing circuit 121.

The process then proceeds to step S79. The summing circuit 121 reads the HD pixel of the supervisor data, which is the specified pixel, from the learning-pair database 63, and computes the component $x_{n,k}x_{n',k}h_k$ in the matrix at the left side and the component $x_{n,k}y_k h_k$ in the vector at the right side in equations (20) for the parameter z supplied from the parameter generating circuit 127 by using the specified pixel $y_k$, the predictive tap $x_{n,k}$ supplied from the predictive-tap generating circuit 65, and the weight $h_k$ supplied from the weight control circuit 126. The summing circuit 121 also performs summation for, among the matrix components and the vector components which have been obtained for the parameter z supplied from the parameter generating circuit 127, the components $x_{n,k}x_{n',k}h_k$ in the matrix that has been determined from the specified pixels and the predictive taps and the components $x_{n,k}y_k h_k$ in the vector corresponding to the class code supplied from the classification circuit 66. The process then proceeds to step S80.

In step S80, the parameter generating circuit 127 determines whether the parameter z output from the parameter generating circuit 127 is equal to the maximum parameter Z, which can be taken as the parameter z. If it is determined in step S80 that the parameter z output from the parameter generating circuit 127 is not equal to the maximum parameter Z (smaller than the maximum parameter Z), the process proceeds to step S81. In step S81, the parameter generating circuit 127 adds, for example, 1 to the parameter, and outputs the resulting value to the summing circuit 121 and the weight control circuit 126 as the new parameter. The process then returns to step S74, and processing similar to the above-described processing is repeated.

That is, in this case, in step S74, the weight control circuit 126 selects the weighting characteristic associated with the new parameter z supplied from the parameter generating circuit 127 from the plurality of types of weighting characteristics stored in the weight control circuit 126, and determines the selected weighting characteristic to be used for controlling weighting performed in the summing circuit 121. Processing similar to the above-described processing is then repeated.

If it is determined in step S80 that the parameter z is equal to the maximum parameter Z, the process proceeds to step S82. In step S82, the class-tap generating circuit 64 determines whether there is any item of supervisor data which has not been determined as the specified pixel in the learning-pair database 63. If it is determined in step S82 that there is any unspecified item of supervisor data stored in the learning-pair database 63, the process returns to step S72, and processing similar to the above-described processing is repeated.

If it is determined in step S82 that there is no unspecified item of supervisor data in the learning-pair database 63, the summing circuit 121 supplies the matrix at the left side and the vector at the right side in equations (20) that have been obtained for each value of the parameter z and for each class to the tap-coefficient computing circuit 122. The process then proceeds to step S83.

In step S83, the tap-coefficient computing circuit 122 solves the normal equations consisting of the matrix at the left side and the vector at the right side in equations (20) for each value of the parameter z and for each class supplied from the summing circuit 121, thereby determining the tap coefficient $w_n$ for each value of the parameter z and for each class. The tap-coefficient computing circuit 122 supplies the tap coefficient $w_n$ for each value of the parameter z and for each class to the summing circuit 123. The process then proceeds to step S84.

In step S84, the summing circuit 123 performs summation in equations (31) for the parameter z and the tap coefficient $w_n$ for each value of the parameter z and for each class supplied from the tap-coefficient computing circuit 122 so as to determine the component $X_{i,j}$ defined in equation (29) and the component $Y_i$ defined in equation (30).

More specifically, in step S84, by using the variable $t_i(t_j)$ determined in equation (22), the summing circuit 123 performs computation of the multiplication $(t_i t_j)$ of the variables $t_i(t_j)$ associated with the parameter z and summation ($\Sigma$) so as to determine the component $X_{i,j}$ defined in equation (29) in the matrix at the left side in equations (31) for each value of the parameter z. Also in step S84, by using the variable $t_i$ determined in equation (22) from each value of the parameter z and the tap coefficient $w_n$ for the corresponding value of the parameter z supplied from the tap-coefficient computing circuit 122, the summing circuit 123 performs computation of the multiplication ($t_i w_n$) of the variable $t_i$ and the optimal tap coefficient $w_n$ associated with the parameter z and summation (X) so as to determine the component $Y_i$ defined in equation (30) in the vector at the right side in equations (31).

The summing circuit 123 determines the component $X_{ij}$ expressed by equation (29) and the component $Y_i$ expressed by equation (30) for each class so as to establish the normal equations expressed by equations (31) for each class, and supplies the normal equations to the coefficient-source computing circuit 124. The process then proceeds from step S84 to step S85.

In step S85, the coefficient-source computing circuit 124 solves the normal equations in equations (31) for each class supplied from the summing circuit 123 so as to determine the coefficient source data $\beta_{m,n}$ for each class, and supplies it to the coefficient-source data memory 125 and stores it therein. The process is then completed.

The coefficient source data obtained as described above is stored in the coefficient source RAM 114 of the image processing apparatus shown in FIG. 12.

It is now assumed that the optimal tap coefficient $w_n$ for each value of the parameter z output from the tap-coefficient computing circuit 122 shown in FIG. 14 is stored in the image processing apparatus shown in FIG. 8, and the optimal tap coefficient corresponding to the parameter z in accordance with the operation performed on the operation unit 102 is selected and used. In this case, in the image processing apparatus in FIG. 8, a large-capacity memory in proportion to the number of discrete values (0, 1, . . . , Z, in this example) that can be taken as the parameter z is required. In contrast, in the image processing apparatus shown in FIG. 12, since the storage capacity of the coefficient source RAM 114 storing coefficient source data therein is not dependent on the number of values that can be taken as the parameter z, a small-capacity memory can be used. When the coefficient source data $\beta_{m,n}$ is stored, the tap coefficient $w_n$ is generated from the coefficient source data $\beta_{m,n}$ and the parameter z according to equation (21), thereby obtaining the consecutive tap coefficients $w_n$ according to the values of the parameter z.

In the image processing apparatus shown in FIG. 12, as stated above, tap coefficients corresponding to weighting characteristics, which are consecutively varied according to the values of the parameter z, can be obtained. The user is thus able to obtain a desired image.

The above-described series of processings may be performed by using hardware or software. If software is used, a software program is installed into, for example, a general-purpose computer.

Figure 16:
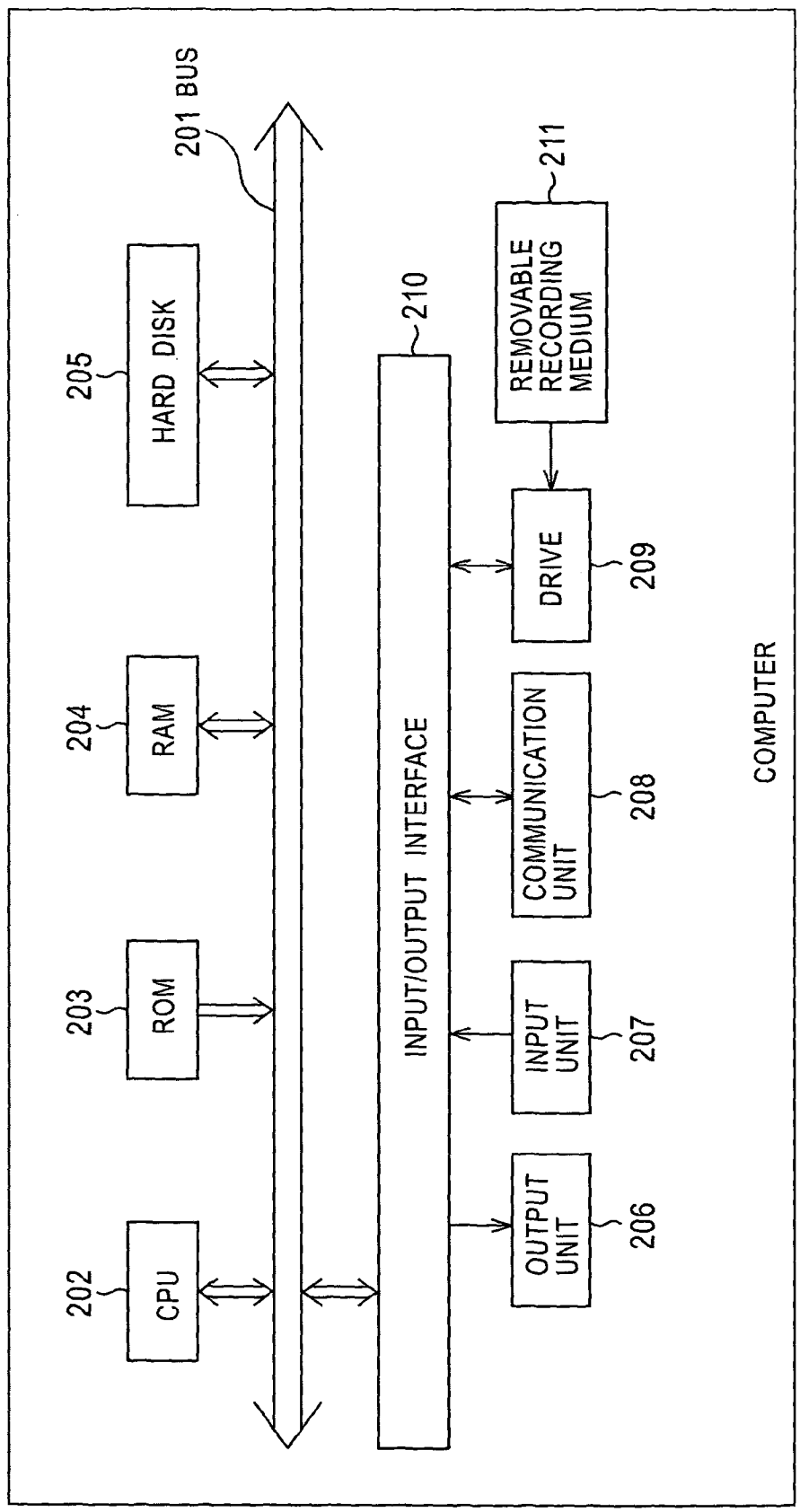
FIG. 16 is a block diagram illustrating an example of the configuration of an embodiment of a computer to which the present invention is applied.

FIG. 16 illustrates an example of the configuration of an embodiment of a computer into which a program executing the above-described series of processings is installed.

A program can be prerecorded in a hard disk 205 or a ROM 203, which serves as a recording medium integrated in the computer.

Alternatively, the program may be temporarily or permanently stored (recorded) in a removable recording medium 211, such as a flexible disk, a CD-ROM (Compact Disc Read Only Memory), an MO (Magneto Optical) disk, a DVD (Digital Versatile Disc), a magnetic disk, or a semiconductor memory. The removable recording medium 211 can be provided as so-called "package software".

The program may be installed into the computer from the above-described removable recording medium 211, and may also be transferred to the computer by wireless means from a download site via an artificial satellite for digital satellite broadcasting, or may be transferred to the computer by wireless means via a network, such as a LAN (Local Area Network) or the Internet. Then, the computer is able to receive the program transferred as described above by a communication unit 208 and install the program into the built-in hard disk 205.

The computer has a built-in CPU (Central Processing Unit) 202. An input/output interface 210 is connected to the CPU 202 via a bus 201. Upon the input of an instruction by operating an input unit 207, which consists of a keyboard, a mouse, or a microphone, by the user via the input/output interface 210, the CPU 202 executes a program stored in the ROM (Read Only Memory) 203. The CPU 202 also loads the following types of programs into a RAM (Random Access Memory) 204 and executes them: a program stored in the hard disk 205, a program transferred from a satellite or a network, received by the communication unit 208, and installed into the hard disk 205, and a program read from the removable recording medium 211 loaded in a drive 209 and installed into the hard disk 205. Accordingly, the CPU 202 executes the processings indicated by the above-described flowcharts or the processings performed by the functions of the above-described block diagrams. The CPU 202 then outputs the processing results, if necessary, from an output unit 206, which consists of an LCD (Liquid Crystal Display) or a speaker, or transmits the processing results from the communication unit 208, or records them in the hard disk 205, via the input/output interface 210.

Steps forming the programs for allowing the computer to execute the various processings is not necessarily performed in chronological order as described in the flowcharts of the specification. Alternatively, the steps may be performed concurrently or individually (for example, concurrent processing or object processing are included).

The programs may be performed by a single computer, or a plurality of computers may be used for performing distribute processing on the programs. Alternatively, the programs may be transferred to a remote computer and be executed.

In this embodiment, the present invention has been described in the context of the conversion of SD image data into HD image data. However, the present invention can be applied to the case in which another type of data, for example, audio data, is converted into higher-quality audio data.

In the present invention, SD image data may be converted into HD image data having a larger number of pixels, HD image data having improved spatial resolution, HD image data having improved temporal resolution (a larger number of frames or fields), or HD image data having improved level-direction resolution (a larger number of bits allocated to the pixel values). Alternatively, the present invention may be used for enlarging images.

In this embodiment, the image processing apparatus for converting an image and the learning device for learning a tap coefficient or coefficient source data for each class used in the image processing apparatus are separately formed. However, the image processing apparatus and the learning device may be integrally formed. In this case, the learning device can perform learning in real time, and the tap coefficients used in the image processing apparatus can be updated in real time.

Although in this embodiment a tap coefficient for each class is prestored in the coefficient RAM 5, the tap coefficient may be supplied to the image processing apparatus together with, for example, an SD image.

Although in this embodiment the parameter z is input by the user, it may be supplied to the image processing apparatus together with, for example, an SD image.

In this embodiment, an HD pixel is determined by a linear equation expressed by equation (1). However, an HD image may be determined by a quadratic expression or an expression of a higher degree.

The image processing apparatus shown in FIG. 2, 8, or 12 can be applied to, for example, a television receiver for receiving television broadcast signals and displaying images, a DVD playback apparatus for playing back image data from DVD and outputting it, or a VTR for playing back image data from video tape and outputting it, or an apparatus for processing another type of image.

The applicant of this application has proposed a method in Japanese Unexamined Patent Application Publication No. 8-79712 in which classification is conducted by using the dynamic ranges of a plurality of pixels forming an image to be converted, and then, an image is converted into a higher-quality image by adaptive processing. The method disclosed in Japanese Unexamined Patent Application Publication No. 8-79712 is similar to the invention of this application in that an image is converted by using a tap coefficient for each class while considering the dynamic range, i.e., by using a tap coefficient suitable for the dynamic range so as to obtain an image of a higher quality.

In the method disclosed in Japanese Unexamined Patent Application Publication No. 8-79712, however, classification is merely performed by considering the dynamic range. Thus, the method of the above publication is totally different from that of the invention of this application in which tap coefficients are learned while applying weighting to a specified pixel and a predictive tap according to the dynamic range of the predictive tap, and then, an image is converted by using the learned tap coefficients.

The applicant of this application has also proposed the following method in Japanese Unexamined Patent Application Publication No. 2001-8056. In a transmitter, learning is conducted by setting an HD image and an SD image as supervisor data and as learner data, respectively, while applying a large weight to a specified pixel having a small predictive error and a predictive tap so as to determine a tap coefficient. The tap coefficient and the SD image are sent to a receiver, and the receiver converts the SD image into an HD image by using the tap coefficient transmitted together with the SD image. The method disclosed in Japanese Unexamined Patent Application Publication No. 2001-8056, which has been previously proposed by the same applicant, is similar to the invention of this application in that an SD image used for learning tap coefficients is converted into an HD image by using the tap coefficients so as to obtain a super-high quality HD image. The method disclosed in Japanese Unexamined Patent Application Publication No. 2001-8056 is also similar to the invention of this application in that tap coefficients are learned while applying weighting to specified pixels and predictive taps.

According to the method disclosed in Japanese Unexamined Patent Application Publication No. 2001-8056, however, since weighting is performed in accordance with a predictive error, an SD image used for learning must be first converted into an HD image by using a tap coefficient determined by learning, and then, a predictive error between the resulting HD image and the HD image used for learning must be determined. Thus, it takes relatively a long time to conduct learning for determining tap coefficients. On the other hand, in the invention of this application, weighting is applied according to the activity, for example, the dynamic range of a predictive tap, without the need to determine a predictive error, thereby implementing fast learning for tap coefficients.

According to the method disclosed in Japanese Unexamined Patent Application Publication No. 2001-8056, learning for tap coefficients is conducted while applying a large weight to specified pixels having small predictive errors and predictive taps, and thus, a resulting HD image has a very small predictive error.

According to the method disclosed in Japanese Unexamined Patent Application Publication No. 2001-8056, however, learning for tap coefficients is performed by groups according to the values of the predictive errors since weighting is applied according to the predictive errors. Basically, therefore, SD images to be converted by using tap coefficients are limited to SD images that allow predictive errors to be determined, i.e., SD images used for learning tap coefficients. That is, the tap coefficients determined by the method of Japanese Unexamined Patent Application Publication No. 2001-8056 are not suitable for converting SD images other than the SD images used for learning the tap coefficients (it is difficult to obtain high-quality HD images if SD images other than the SD images used for learning tap coefficients are converted). In contrast, in the invention of this application, SD images other than the SD images used for learning tap coefficients can be converted into high-quality HD images.

INDUSTRIAL APPLICABILITY

As described above, according to the present invention, data can be converted into higher-quality data.

The invention claimed is:

1. A data conversion apparatus for converting first data into second data, comprising:
   class-tap generating means for generating, from the first data, a class tap used for classifying a specified item of the second data into a class of at least one class;
   classification means for classifying the specified item of the second data based on the class tap;
   predictive-tap generating means for generating a predictive tap for determining the specified item of the second data from the first data;
   tap-coefficient obtaining means for obtaining a tap coefficient for the class of the specified item of the second data from tap coefficients obtained by using second learning data corresponding to the second data and first learning data corresponding to the first data and by learning a relationship between the second learning data and the first learning data for each of said at least one class while applying weighting to the second learning data and the first learning data based on an activity of the predictive tap generated from the first learning data; and
   computation means for determining the specified item of the second data by using the predictive tap and the tap coefficient for the class of the specified item of the second data,
   wherein the tap-coefficient obtaining means applies the weighting to the second learning data and the first learning data by using the tap coefficient and a second coefficient that is determined based on an activity of the predictive tap generated from the first learning data.

2. A data conversion apparatus according to claim 1, wherein said computation means determines the specified item of the second data by linear coupling of the predictive tap and the tap coefficient for the class of the specified item of the second data.

3. A data conversion apparatus according to claim 1, wherein the second data is data of a higher quality than the first data.

4. A data conversion apparatus according to claim 1, further comprising tap-coefficient storage means for storing the tap coefficient for each of said at least one class.

5. A data conversion apparatus according to claim 1, further comprising tap-coefficient selection means for selecting a tap coefficient corresponding to a predetermined weighting characteristic from tap coefficients corresponding to a plurality of weighting characteristics obtained by learning the relationship between the second learning data and the first learning data while applying the plurality of weighting characteristics to the second-learning data and the first learning data, wherein said tap-coefficient obtaining means obtains the tap coefficient for the class of the specified item of the second data from the tap coefficient corresponding to the predetermined weighting characteristic selected by said tap-coefficient selection means.

6. A data conversion apparatus according to claim 5, further comprising operation means operated by a user, wherein said tap-coefficient selection means selects the tap coefficient corresponding to the weighting characteristic in accordance with the operation performed on said operation means.

7. A data conversion apparatus according to claim 1, further comprising tap-coefficient generating means for generating the tap coefficient from coefficient source data, which serves as a source of the tap coefficient.

8. A data conversion apparatus according to claim 7, further comprising coefficient-source storage means for storing the coefficient source data, which serves as the source of the tap coefficient.

9. A data conversion apparatus according to claim 7, wherein said tap-coefficient generating means generates, by using the coefficient source data and a parameter representing the weighting characteristic, a tap coefficient corresponding to the weighting characteristic represented by the parameter.

10. A data conversion apparatus according to claim 9, further comprising input means for inputting the parameter.

11. A data conversion apparatus according to claim 1, wherein the first and second data are first and second image data, respectively.

12. A data conversion apparatus according to claim 1, wherein the activity is the magnitude of a dynamic range of the predictive tap.

13. A data conversion method of a data conversion apparatus for converting first data into second data, comprising:
a class-tap generating step of generating, from the first data, a class tap used for classifying a specified item of the second data into a class of at least one class;
a classification step of classifying the specified item of the second data based on the class tap;
a predictive-tap generating step of generating a predictive tap for determining the specified item of the second data from the first data;
a tap-coefficient obtaining step of obtaining a tap coefficient for the class of the specified item of the second data from tap coefficients obtained by using second learning data corresponding to the second data and first learning data corresponding to the first data and by learning a relationship between the second learning data and the first learning data for each of said at least one class while applying weighting to the second learning data and the first learning data based on an activity of the predictive tap generated from the first learning data; and
a computation step of determining the specified item of the second data by using the predictive tap and the tap coefficient for the class of the specified item of the second data,
wherein the tap-coefficient obtaining step applies the weighting to the second learning data and the first learning data by using the tap coefficient and a second coefficient that is determined based on an activity of the predictive tap generated from the first learning data.

14. A non-transitory computer-readable medium storing a computer program allowing a computer to execute data conversion processing for converting first data into second data, said program comprising: a class-tap generating step of generating, from the first data, a class tap used for classifying a specified item of the second data into a class of at least one class;
a classification step of classifying the specified item of the second data based on the class tap;
a predictive-tap generating step of generating a predictive tap for determining the specified item of the second data from the first data;
a tap-coefficient obtaining step of obtaining a tap coefficient for the class of the specified item of the second data from tap coefficients obtained by using second learning data corresponding to the second data and first learning data corresponding to the first data and by learning a relationship between the second learning data and the first learning data for each of said at least one class while applying weighting to the second learning data and the first learning data based on an activity of the predictive tap generated from the first learning data; and
a computation step of determining the specified item of the second data by using the predictive tap and the tap coefficient for the class of the specified item of the second data,
wherein the tap-coefficient obtaining step applies the weighting to the second learning data and the first learning data by using the tap coefficient and a second coefficient that is determined based on an activity of the predictive tap generated from the first learning data.

15. A non-transitory recording medium in which a program allowing a computer to execute data conversion processing for converting first data into second data is recorded, said program comprising: a class-tap generating step of generating, from the first data, a class tap used for classifying a specified item of the second data into a class of at least one class;
a classification step of classifying the specified item of the second data based on the class tap;
a predictive-tap generating step of generating a predictive tap for determining the specified item of the second data from the first data;
a tap-coefficient obtaining step of obtaining a tap coefficient for the class of the specified item of the second data from tap coefficients obtained by using second learning data corresponding to the second data and first learning data corresponding to the first data and by learning a relationship between the second learning data and the first learning data for each of said at least one class while applying weighting to the second learning data and the first learning data based on an activity of the predictive tap generated from the first learning data; and
a computation step of determining the specified item of the second data by using the predictive tap and the tap coefficient for the class of the specified item of the second data,
wherein the tap-coefficient obtaining step applies the weighting to the second learning data and the first learning data by using the tap coefficient and a second coefficient that is determined based on an activity of the predictive tap generated from the first learning data.

16. A learning device for learning a tap coefficient used for converting first data into second data, comprising:
- class-tap generating means for generating a class tap from first learning data corresponding to the first data, the class tap being used for classifying a specified item of second learning data corresponding to the second data used for learning the tap coefficient into a class of at least one class;
- classification means for classifying the specified item of the second data based on the class tap;
- predictive-tap generating means for generating a predictive tap used for determining the specified item of the second data from the first learning data;
- learning-means for determining the tap coefficient for each of said at least one class by learning a relationship between the second learning data and the first learning data for each of said at least one class while applying predetermined weighting to the predictive tap and the specified item of the second data;
- activity detection means for determining an activity of the predictive tap obtained for the specified item of the second data; and
- weighting control means for controlling weighting applied to the predictive tap and the specified item of the second data in said learning means based on the activity of the predictive tap obtained for the specified item of the second data,
- wherein the learning means applies the predetermined weighting to the specified item of the second learning data and the first learning data by using the tap coefficient and a second coefficient that is determined based on an activity of the predictive tap generated from the first learning data.

17. A learning device according to claim 16, wherein said learning means learns the tap coefficient for determining the specified item of the second data by linear coupling of the predictive tap and the tap coefficient for the class of the specified item of the second data.

18. A learning device according to claim 16, wherein the second data is data of a higher quality than the first data.

19. A learning device according to claim 16, wherein: said weighting control means controls weighting applied to the predictive tap and the specified item of the second data according to each of a plurality of weighting characteristics based on the activity of the predictive tap; and
- said learning means determines the tap coefficient for each of said at least one class in accordance with each of the plurality of weighting characteristics by learning a relationship between the second learning data and the first learning data for each of said at least one class while applying each of the plurality of weighting characteristics to the predictive tap and the specified item of the second data.

20. A learning device according to claim 16, wherein the first and second data are image data.

21. A learning device according to claim 16, wherein the activity is the magnitude of a dynamic range of the predictive tap.

22. A learning method of a learning apparatus for learning a tap coefficient used for converting first data into second data, comprising:
- a class-tap generating step of generating a class tap from first learning data corresponding to the first data, the class tap being used for classifying a specified item of second learning data corresponding to the second data used for learning the tap coefficient into a class of at least one class;
- a classification step of classifying the specified item of the second data based on the class tap;
- a predictive-tap generating step of generating a predictive tap used for determining the specified item of the second data from the first learning data;
- a learning step of determining the tap coefficient for each of said at least one class by learning a relationship between the second learning data and the first learning data for each of said at least one class while applying predetermined weighting to the predictive tap and the specified item of the second data;
- an activity detection step of determining an activity of the predictive tap obtained for the specified item of the second data; and
- a weighting control step of controlling weighting applied to the predictive tap and the specified item of the second data in said learning step based on the activity of the predictive tap obtained for the specified item of the second data,
- wherein the learning step applies the predetermined weighting to the specified item of the second learning data and the first learning data by using the tap coefficient and a second coefficient that is determined based on an activity of the predictive tap generated from the first learning data.

23. A non-transitory computer-readable medium storing a computer program allowing a computer to execute learning processing for learning a tap coefficient used for converting first data into second data, comprising: a class-tap generating step of generating a class tap from first learning data corresponding to the first data, the class tap being used for classifying a specified item of second learning data corresponding to the second data used for learning the tap coefficient into a class of at least one class;
- a classification step of classifying the specified item of the second data based on the class tap;
- a predictive-tap generating step of generating a predictive tap used for determining the specified item of the second data from the first learning data;
- a learning step of determining the tap coefficient for each of said at least one class by learning a relationship between the second learning data and the first learning data for each of said at least one class while applying predetermined weighting to the predictive tap and the specified item of the second data;
- an activity detection step of determining an activity of the predictive tap obtained for the specified item of the second data; and
- a weighting control step of controlling weighting applied to the predictive tap and the specified item of the second data in said learning step based on the activity of the predictive tap obtained for the specified item of the second data,
- wherein the learning step applies the predetermined weighting to the specified item of the second learning data and the first learning data by using the tap coefficient and a second coefficient that is determined based on an activity of the predictive tap generated from the first learning data.

24. A non-transitory recording medium in which a program allowing a computer to execute learning processing for learning a tap coefficient used for converting first data into second data is recorded, said program comprising: a class-tap generating step of generating a class tap from first learning data corresponding to the first data the class tap being used for classifying a specified item of second learning data corresponding to the second data used for learning the tap coefficient into a class of at least one class;
   a classification step of classifying the specified item of the second data based on the class tap;
   a predictive-tap generating step of generating a predictive tap used for determining the specified item of the second data from the first learning data;
   a learning step of determining the tap coefficient for each of said at least one class by learning a relationship between the second learning data and the first learning data for each of said at least one class while applying predetermined weighting to the predictive tap and the specified item of the second data;
   an activity detection step of determining an activity of the predictive tap obtained for the specified item of the second data; and
   a weighting control step of controlling weighting applied to the predictive tap and the specified item of the second data in said learning step based on the activity of the predictive tap obtained for the specified item of the second data,
   wherein the learning step applies the predetermined weighting to the specified item of the second learning data and the first learning data by using the tap coefficient and a second coefficient that is determined based on an activity of the predictive tap generated from the first learning data.

25. A learning device for learning coefficient source data, which serves as a source of a tap coefficient used for converting first data into second data, comprising:
   class-tap generating means for generating a class tap from first learning data corresponding to the first data, the class tap being used for classifying a specified item of second learning data corresponding to the second data used for learning the coefficient source data into a class of at least one class;
   classification means for classifying the specified item of the second data based on the class tap;
   predictive-tap generating means for generating a predictive tap used for determining the specified item of the second data from the first learning data;
   learning means for determining the coefficient source data for each of said at least one class by learning a relationship between the second learning data and the first learning data for each of said at least one class while applying predetermined weighting to the predictive tap and the specified item of the second data;
   activity detection means for determining an activity of the predictive tap obtained for the specified item of the second data; and
   weighting control means for controlling weighting applied to the predictive tap and the specified item of the second data in said learning means based on the activity of the predictive tap obtained for the specified item of the second data,
   wherein the learning means applies the predetermined weighting to the specified item of the second learning data and the first learning data by using the tap coefficient and a second coefficient that is determined based on an activity of the predictive tap generated from the first learning data.

26. A learning device according to claim 25, wherein said learning means learns the coefficient source data, which serves as the source of the tap coefficient for determining the specified item of the second data by linear coupling of the predictive tap and the tap coefficient for the class of the specified item of the second data.

27. A learning device according to claim 25, wherein the second data is data of a higher quality than the first data.

28. A learning device according to claim 25, further comprising parameter generating means for generating a parameter representing a weighting characteristic, wherein:
   said weighting control means controls weighting applied to the predictive tap and the specified item of the second data according to the weighting characteristic represented by the parameter data based on the activity of the predictive tap; and
   said learning means comprises: first learning means for determining the tap coefficient for each of said at least one class corresponding to each of weighting characteristics represented by a plurality of said parameters by learning a relationship between the second learning data and the first learning data for each of said at least one class while applying the weighting characteristics represented by the plurality of parameters to the predictive tap and the specified item of the second data; and
   second learning means for determining the coefficient source data for each of said at least one class by learning a relationship between the tap coefficient for each of said at least one class and the plurality of parameters in accordance with each of the weighting characteristics represented by the plurality of parameters.

29. A learning device according to claim 25, wherein the first and second data are image data.

30. A learning device according to claim 25, wherein the activity is the magnitude of a dynamic range of the predictive tap.

31. A learning method of a learning apparatus for learning coefficient source data, which serves as a source of a tap coefficient used for converting first data into second data, comprising:
   a class-tap generating step of generating a class tap from first learning data corresponding to the first data, the class tap being used for classifying a specified item of second learning data corresponding to the second data used for learning the coefficient source data into a class of at least one class;
   a classification step of classifying the specified item of the second data based on the class tap;
   a predictive-tap generating step of generating a predictive tap used for determining the specified item of the second data from the first learning data;
   a learning step of determining the coefficient source data for each of said at least one class by learning a relationship between the second learning data and the first learning data for each of said at least one class while applying predetermined weighting to the predictive tap and the specified item of the second data;
   an activity detection step of determining an activity of the predictive tap obtained for the specified item of the second data; and
   a weighting control step of controlling weighting applied to the predictive tap and the specified item of the second data in said learning step based on the activity of the predictive tap obtained for the specified item of the second data,
   wherein the learning step applies the predetermined weighting to the specified item of the second learning data and the first learning data by using the tap coefficient and a second coefficient that is determined based on an activity of the predictive tap generated from the first learning data.

32. A non-transitory computer-readable medium storing a computer program allowing a computer to execute learning processing for learning coefficient source data, which serves as a source of a tap coefficient used for converting first data into second data, comprising: a class-tap generating step of generating a class tap from first learning data corresponding to the first data, the class tap being used for classifying a specified item of second learning data corresponding to the second data used for learning the coefficient source data into a class of at least one class;

- a classification step of classifying the specified item of the second data based on the class tap;
- a predictive-tap generating step of generating a predictive tap used for determining the specified item of the second data from the first learning data;
- a learning step of determining the coefficient source data for each of said at least one class by learning a relationship between the second learning data and the first learning data for each of said at least one class while applying predetermined weighting to the predictive tap and the specified item of the second data;
- an activity detection step of determining an activity of the predictive tap obtained for the specified item of the second data; and
- a weighting control step of controlling weighting applied to the predictive tap and the specified item of the second data in said learning step based on the activity of the predictive tap obtained for the specified item of the second data,
- wherein the learning step applies the predetermined weighting to the specified item of the second learning data and the first learning data by using the tap coefficient and a second coefficient that is determined based on an activity of the predictive tap generated from the first learning data.

33. A non-transitory recording medium in which a program allowing a computer to execute learning processing for learning coefficient source data, which serves as a source of a tap coefficient used for converting first data into second data, is recorded, said program comprising:

- a class-tap generating step of generating a class tap from first learning data corresponding to the first data, the class tap being user for classifying a specified item of second learning data corresponding to the second data used for learning the coefficient source data into a class of at least one class;
- a classification step of classifying the specified item of the second data based on the class tap;
- a predictive-tap generating step of generating a predictive tap used for determining the specified item of the second data from the first learning data;
- a learning step of determining the coefficient source data for each of said at least one class by learning a relationship between the second learning data and the first learning data for each of said at least one class while applying predetermined weighting to the predictive tap and the specified item of the second data;
- an activity detection step of determining an activity of the predictive tap obtained for the specified item of the second data; and
- a weighting control step of controlling weighting applied to the predictive tap and the specified item of the second data in said learning step based on the activity of the predictive tap obtained for the specified item of the second data,
- wherein the learning step applies the predetermined weighting to the specified item of the second learning data and the first learning data by using the tap coefficient and a second coefficient that is determined based on an activity of the predictive tap generated from the first learning data.

* * * * *